United States Patent
Ngai et al.

(10) Patent No.: US 9,344,174 B2
(45) Date of Patent: May 17, 2016

(54) SYSTEMS, APPARATUS, AND METHODS FOR ANTENNA SELECTION

(71) Applicant: Qualcomm Incorporated, San Diego, CA (US)

(72) Inventors: Francis Ming-Meng Ngai, Louisville, CO (US); Rashid Ahmed Akbar Attar, San Diego, CA (US); Daniel Fred Filipovic, Solana Beach, CA (US); Donna Ghosh, San Diego, CA (US); Christopher Gerard Lott, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 13/711,410

(22) Filed: Dec. 11, 2012

(65) Prior Publication Data
US 2013/0308554 A1   Nov. 21, 2013

Related U.S. Application Data

(60) Provisional application No. 61/649,704, filed on May 21, 2012, provisional application No. 61/716,582, filed on Oct. 21, 2012.

(51) Int. Cl.
*H04B 7/06* (2006.01)
*H04B 1/44* (2006.01)
(Continued)

(52) U.S. Cl.
CPC ............ *H04B 7/0608* (2013.01); *H04B 1/0053* (2013.01); *H04B 1/44* (2013.01); *H04B 7/0404* (2013.01); *H04B 7/0602* (2013.01); *H04B 7/0604* (2013.01); *H04B 7/0802* (2013.01);
(Continued)

(58) Field of Classification Search
None
See application file for complete search history.

(56) References Cited

U.S. PATENT DOCUMENTS

| | | |
|---|---|---|
| 5,481,571 A | 1/1996 | Balachandran et al. |
| 5,530,926 A | 6/1996 | Rozanski |

(Continued)

FOREIGN PATENT DOCUMENTS

| | | |
|---|---|---|
| CN | 1764076 A | 4/2006 |
| CN | 101562459 A | 10/2009 |

(Continued)

OTHER PUBLICATIONS

International Search Report and Written Opinion—PCT/US2013/035422—ISA/EPO—Jun. 28, 2013.

(Continued)

*Primary Examiner* — Christopher Crutchfield
(74) *Attorney, Agent, or Firm* — Jia J. Wu

(57) ABSTRACT

This disclosure provides systems, methods, and apparatus for mobile transmit diversity. In one aspect, a wireless communication apparatus is provided. The wireless communication apparatus includes a plurality of antennas. The wireless communication apparatus further includes a plurality of transmit circuits, each transmit circuit of the plurality of transmit circuits being configured to transmit according to a different radio access technology. The wireless communication apparatus further includes a controller configured to selectively switch each of the transmit circuits of the plurality of transmit circuits to transmit wireless communications via a corresponding one of the plurality of antennas based on priority levels of data for each of the transmit circuits and a detected operating mode of the wireless communication apparatus.

41 Claims, 13 Drawing Sheets

(51) Int. Cl.
*H04B 7/04* (2006.01)
*H04B 7/08* (2006.01)
*H04B 1/00* (2006.01)
*H04W 36/00* (2009.01)
*H04W 88/00* (2009.01)

(52) U.S. Cl.
CPC ............ *H04B 7/0814* (2013.01); *H04B 7/0817* (2013.01); *H04B 7/0822* (2013.01); *H04B 7/0834* (2013.01); *H04W 36/00* (2013.01); *H04W 88/00* (2013.01)

(56) References Cited

U.S. PATENT DOCUMENTS

| | | | |
|---|---|---|---|
| 5,541,963 | A | 7/1996 | Nakagoshi |
| 5,940,454 | A | 8/1999 | McNicol et al. |
| 6,029,057 | A | 2/2000 | Paatelma et al. |
| 6,032,033 | A | 2/2000 | Morris et al. |
| 6,035,183 | A | 3/2000 | Todd et al. |
| 6,360,088 | B1 | 3/2002 | Shi et al. |
| 6,594,475 | B1 | 7/2003 | Anvekar et al. |
| 6,947,716 | B2 | 9/2005 | Ono |
| 6,961,545 | B2 | 11/2005 | Tehrani et al. |
| 7,295,528 | B2* | 11/2007 | Ibrahim et al. ................. 370/310 |
| 7,447,171 | B2 | 11/2008 | Smallcomb et al. |
| 7,471,702 | B2 | 12/2008 | Laroia et al. |
| 7,492,842 | B2 | 2/2009 | Yen et al. |
| 7,499,691 | B1 | 3/2009 | Dunn et al. |
| 7,502,592 | B2 | 3/2009 | Yamamoto et al. |
| 7,546,404 | B2* | 6/2009 | Yeh et al. ....................... 710/117 |
| 7,907,573 | B2 | 3/2011 | Lee et al. |
| 7,991,429 | B2 | 8/2011 | Chiu |
| 8,009,096 | B2 | 8/2011 | Harel et al. |
| 8,014,817 | B2 | 9/2011 | Suzuki et al. |
| 8,036,710 | B2 | 10/2011 | Walton et al. |
| 8,085,734 | B2* | 12/2011 | Faber ........................... 370/334 |
| 8,144,821 | B2 | 3/2012 | Hutchison et al. |
| 8,159,399 | B2* | 4/2012 | Dorsey et al. ................. 343/702 |
| 8,213,344 | B2* | 7/2012 | Zhu et al. ...................... 370/278 |
| 8,244,944 | B1* | 8/2012 | Wong et al. .................... 710/240 |
| 8,301,192 | B2* | 10/2012 | Kakitsu et al. ............... 455/553.1 |
| 8,340,714 | B2* | 12/2012 | Hassan ............... H01Q 1/2291 343/729 |
| 8,417,205 | B2 | 4/2013 | Tang et al. |
| 8,463,214 | B2 | 6/2013 | Yen et al. |
| 8,600,427 | B2* | 12/2013 | Ibrahim et al. ................. 455/522 |
| 8,615,270 | B2* | 12/2013 | Ibrahim et al. .............. 455/552.1 |
| 8,755,359 | B2* | 6/2014 | Faber ........................... 370/334 |
| 8,831,532 | B2 | 9/2014 | Nukala et al. |
| 2002/0086648 | A1 | 7/2002 | Wilhelmsson et al. |
| 2002/0118724 | A1 | 8/2002 | Kishimoto et al. |
| 2002/0126640 | A1 | 9/2002 | Komatsu |
| 2003/0157954 | A1 | 8/2003 | Medvedev et al. |
| 2004/0029619 | A1* | 2/2004 | Liang et al. ................. 455/562.1 |
| 2004/0229650 | A1 | 11/2004 | Fitton et al. |
| 2004/0242277 | A1 | 12/2004 | Kiribayashi |
| 2005/0059431 | A1 | 3/2005 | Matsui et al. |
| 2005/0101252 | A1 | 5/2005 | Carvalho et al. |
| 2005/0113038 | A1 | 5/2005 | Kasami et al. |
| 2005/0113039 | A1 | 5/2005 | Tsukamoto |
| 2005/0266903 | A1 | 12/2005 | Masaki |
| 2006/0025090 | A1 | 2/2006 | Shirakata et al. |
| 2006/0073829 | A1 | 4/2006 | Cho et al. |
| 2006/0133544 | A1 | 6/2006 | Kawada et al. |
| 2006/0234776 | A1 | 10/2006 | Ishihara et al. |
| 2006/0252383 | A1 | 11/2006 | Forrester et al. |
| 2006/0276132 | A1* | 12/2006 | Sheng-Fuh et al. ........... 455/41.2 |
| 2007/0032255 | A1 | 2/2007 | Koo et al. |
| 2007/0066244 | A1 | 3/2007 | Kao et al. |
| 2007/0066361 | A1* | 3/2007 | Knudsen et al. ........... 455/562.1 |
| 2007/0093282 | A1 | 4/2007 | Chang et al. |
| 2007/0178839 | A1* | 8/2007 | Rezvani et al. ................. 455/62 |
| 2007/0238496 | A1 | 10/2007 | Chung et al. |
| 2007/0285326 | A1 | 12/2007 | McKinzie et al. |
| 2008/0043671 | A1 | 2/2008 | Moon et al. |
| 2008/0102760 | A1 | 5/2008 | McConnell et al. |
| 2008/0123610 | A1* | 5/2008 | Desai et al. .................... 370/339 |
| 2008/0240280 | A1 | 10/2008 | Li |
| 2008/0311871 | A1 | 12/2008 | Qi et al. |
| 2008/0316913 | A1 | 12/2008 | Kim et al. |
| 2009/0124290 | A1 | 5/2009 | Tao et al. |
| 2009/0137206 | A1* | 5/2009 | Sherman et al. .............. 455/41.2 |
| 2009/0180451 | A1 | 7/2009 | Alpert et al. |
| 2009/0258622 | A1 | 10/2009 | Ruijter |
| 2009/0258627 | A1 | 10/2009 | Hanusch et al. |
| 2010/0022192 | A1 | 1/2010 | Knudsen et al. |
| 2010/0041355 | A1 | 2/2010 | Laroia et al. |
| 2010/0054210 | A1 | 3/2010 | Ostergren |
| 2010/0120466 | A1 | 5/2010 | Li |
| 2010/0172426 | A1 | 7/2010 | Chang |
| 2010/0184459 | A1 | 7/2010 | Mori |
| 2010/0215111 | A1 | 8/2010 | Filipovic et al. |
| 2010/0231473 | A1 | 9/2010 | Shtrom et al. |
| 2010/0232533 | A1 | 9/2010 | Lee et al. |
| 2010/0246725 | A1 | 9/2010 | Okuyama et al. |
| 2010/0296419 | A1 | 11/2010 | Kim et al. |
| 2011/0103442 | A1 | 5/2011 | Nakayauchi et al. |
| 2011/0250926 | A1 | 10/2011 | Wietfeldt et al. |
| 2011/0292786 | A1 | 12/2011 | Haessler et al. |
| 2011/0311001 | A1 | 12/2011 | Lindenbauer et al. |
| 2012/0008510 | A1 | 1/2012 | Cai et al. |
| 2012/0027112 | A1 | 2/2012 | Jiang et al. |
| 2012/0115553 | A1 | 5/2012 | Mahe et al. |
| 2012/0142291 | A1* | 6/2012 | Rath et al. .................... 455/127.1 |
| 2012/0184327 | A1 | 7/2012 | Love et al. |
| 2012/0195224 | A1 | 8/2012 | Kazmi et al. |
| 2012/0202555 | A1 | 8/2012 | Bergman et al. |
| 2012/0207045 | A1 | 8/2012 | Pelletier et al. |
| 2012/0244895 | A1 | 9/2012 | Thomas et al. |
| 2012/0281553 | A1 | 11/2012 | Mujtaba et al. |
| 2012/0282982 | A1 | 11/2012 | Mujtaba et al. |
| 2012/0320803 | A1 | 12/2012 | Skarp |
| 2012/0328057 | A1 | 12/2012 | Kroeger et al. |
| 2013/0005278 | A1 | 1/2013 | Black et al. |
| 2013/0017797 | A1 | 1/2013 | Ramasamy et al. |
| 2013/0023265 | A1 | 1/2013 | Swaminathan et al. |
| 2013/0033996 | A1 | 2/2013 | Song et al. |
| 2013/0035051 | A1 | 2/2013 | Mujtaba et al. |
| 2013/0040671 | A1 | 2/2013 | Zawaideh et al. |
| 2013/0084807 | A1 | 4/2013 | Nukala et al. |
| 2013/0156080 | A1 | 6/2013 | Cheng et al. |
| 2013/0217450 | A1 | 8/2013 | Kanj et al. |
| 2013/0267181 | A1 | 10/2013 | Ayatollahi et al. |
| 2013/0307727 | A1 | 11/2013 | He et al. |
| 2013/0308476 | A1 | 11/2013 | He et al. |
| 2013/0308477 | A1 | 11/2013 | He et al. |
| 2013/0308478 | A1 | 11/2013 | He et al. |
| 2013/0308561 | A1 | 11/2013 | He et al. |
| 2013/0308562 | A1 | 11/2013 | Matin et al. |
| 2013/0308608 | A1 | 11/2013 | Hu et al. |
| 2013/0309981 | A1 | 11/2013 | Ngai et al. |
| 2013/0309982 | A1 | 11/2013 | Yan et al. |
| 2013/0310045 | A1 | 11/2013 | Yan et al. |
| 2013/0310109 | A1 | 11/2013 | Filipovic et al. |
| 2014/0105204 | A1 | 4/2014 | Bengtsson |

FOREIGN PATENT DOCUMENTS

| | | |
|---|---|---|
| CN | 100578962 C | 1/2010 |
| EP | 746118 A1 | 12/1996 |
| EP | 1175021 A2 | 1/2002 |
| EP | 1432067 A2 | 6/2004 |
| EP | 1482658 A2 | 12/2004 |
| EP | 1650885 A2 | 4/2006 |
| EP | 2139125 A1 | 12/2009 |
| EP | 2234276 A2 | 9/2010 |
| WO | WO-9819402 A1 | 5/1998 |
| WO | WO-0159945 A1 | 8/2001 |

(56) References Cited

FOREIGN PATENT DOCUMENTS

| WO | WO-0241517 A2 | 5/2002 |
| --- | --- | --- |
| WO | WO-02082688 A1 | 10/2002 |
| WO | WO-03007502 A1 | 1/2003 |
| WO | WO-2005039073 | 4/2005 |
| WO | 2007058494 A1 | 5/2007 |
| WO | WO-2009098614 A2 | 8/2009 |
| WO | 2010096710 A2 | 8/2010 |
| WO | 2011084715 A1 | 7/2011 |
| WO | 2011084717 A1 | 7/2011 |
| WO | 2012011077 A1 | 1/2012 |

OTHER PUBLICATIONS

Chapter II Demand & Response Under PCT Article 34—The International Preliminary Examining Authority; Feb. 28, 2014; (PCT/US2013/041883).

Heath R W et al., "Multimode Antenna Selection for Spatial Multiplexing Systems With Linear Receivers", IEEE Transactions on Signal Processing, IEEE Service Center, New York, NY, US, vol. 53, No. 8, Aug. 1, 2005, pp. 3042-3056, XP011136488, ISSN: 1053-587X, DOI: DOI:10.1109/TSP.2005.851109.

* cited by examiner

700a

| Device State Index | Tx Power Limit (dBm) |
|---|---|
| DSI = 0 | 24.0 |
| DSI = 1 | 23.0 |
| DSI = 2 | 22.0 |
| DSI = 3 | 21.0 |
| DSI = 4 | 20.0 |
| DSI = 5 | 19.0 |
| DSI = 6 | 18.0 |
| DSI = 7 | 17.0 |
| DSI = 8 | 16.0 |

| Device State Index | Tx Power Limit (dBm) |
|---|---|
| DSI = 0 | 23.0 |
| DSI = 1 | 22.5 |
| DSI = 2 | 21.5 |
| DSI = 3 | 20.5 |
| DSI = 4 | 19.5 |
| DSI = 5 | 18.5 |
| DSI = 6 | 17.5 |
| DSI = 7 | 16.5 |
| DSI = 8 | 15.5 |

FIG. 7B

| | Communication Paramaters/Characteristics | | | | | Tx Power Limit (dBm) | | | | | | | | |
|---|---|---|---|---|---|---|---|---|---|---|---|---|---|---|
| Row | RAT/Tx | Antenna | Band Class | Configuration | UL Channel | DSI = 0 | DSI = 1 | DSI = 2 | DSI = 3 | DSI = 4 | DSI = 5 | DSI = 6 | DSI = 7 | DSI = 8 |
| 1 | RAT 1/Tx 1 | 1 | 0 | NA | Channel A | | 24.0 | | | | | | | |
| 2 | RAT 1/Tx 1 | 1 | 0 | NA | Channel B | 24.0 | 23.0 | 22.0 | 21.0 | 20.0 | 19.0 | 18.0 | 17.0 | 16.0 |
| 3 | RAT 1/Tx 1 | 2 | 0 | NA | Channel A | | 24.0 | | | | | | | |
| 4 | RAT 1/Tx 1 | 2 | 0 | NA | Channel B | | 24.0 | | | | | | | |
| 5 | RAT 1/Tx 1 | 1 | 1 | NA | Channel A | | | | | | | | | |
| 6 | RAT 1/Tx 1 | 1 | 1 | NA | Channel B | 24 | 22 | 21 | 20 | 19 | 18 | 17 | 16 | 15 |
| 7 | RAT 1/Tx 1 | 2 | 1 | NA | Channel A | | | | | | | | | |
| 8 | RAT 1/Tx 1 | 2 | 1 | NA | Channel B | | | | | | | | | |
| 9 | ... | ... | ... | ... | ... | | | | | | | | | |
| 10 | RAT 2/Tx 2 | 1 | N | NA | Channel C | | | | | | | | | |
| 11 | RAT 2/Tx 2 | 1 | N | Modulation Type X | Channel D | 23.0 | 22.5 | 21.5 | 20.5 | 19.5 | 18.5 | 17.5 | 16.5 | 15.5 |
| 12 | RAT 2/Tx 2 | 1 | N | Modulation Type Y | Channel D | | | | 18.5 | | | | | |
| 13 | RAT 2/Tx 2 | 1 | N | Modulation Type Y | Channel E | | | | 23.0 | | | | | |

FIG. 8

SYSTEMS, APPARATUS, AND METHODS FOR ANTENNA SELECTION

CROSS REFERENCE TO RELATED APPLICATIONS

This application claims priority to and benefit under 35 U.S.C. §119(e) to U.S. Provisional Patent Application No. 61/649,704 entitled "SYSTEMS, APPARATUS, AND METHODS FOR AUTONOMOUS ANTENNA SELECTION" filed on May 21, 2012 and U.S. Provisional Patent Application No. 61/716,582 entitled "SYSTEMS, APPARATUS, AND METHODS FOR AUTONOMOUS ANTENNA SELECTION" filed on Oct. 21, 2012; both of said applications are hereby incorporated by reference in their entireties as if fully set forth below and for all applicable purposes.

TECHNICAL FIELD

Embodiments of the present application relate generally to wireless communications, and more specifically to antenna selection for maximizing power transmit and receive levels.

BACKGROUND

Wireless communication systems are widely deployed to provide various types of communication content such as voice and data. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

Mobile devices may further simultaneously support communication using multiple radio access technologies. Different radio access technologies may be used to expand the scope of services offered by the communication such as by expanding the geographic region in which the device may operate, as a mobile device moves through different regions supporting different radio access technologies. Furthermore, different radio access technologies may be used to simultaneously allow a user to engage in a variety of different forms of wireless communication activities.

BRIEF SUMMARY

Various embodiments of systems, methods, and devices within the scope of the appended claims each have several aspects. In some embodiments all or some of these aspects can enable and provide the advantages and features of embodiments. Without limiting the scope of the appended claims, some prominent features are described herein.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides a wireless communication apparatus. The wireless communication apparatus includes a plurality of antennas. The wireless communication apparatus further includes a plurality of transmit circuits, each transmit circuit of the plurality of transmit circuits being configured to transmit according to a different radio access technology. The wireless communication apparatus further includes a controller configured to selectively switch each of the transmit circuits of the plurality of transmit circuits to transmit wireless communications via a corresponding one of the plurality of antennas based on priority levels of data for each of the transmit circuits and a detected operating mode of the wireless communication apparatus.

Another aspect of the subject matter described in the disclosure provides an implementation of a method implemented in a wireless communication apparatus. The method includes receiving an indication of at least one of priority levels of data for each one of a plurality of transmit circuits and a detected operating mode of the wireless communication apparatus, each of the plurality of transmit circuits being configured to transmit according to a different radio access technology. The method further includes selectively switching each of the transmit circuits of the plurality of transmit circuits to transmit wireless communications via a corresponding one of a plurality of antennas based on the priority levels of data for each of the transmit circuits and the detected operating mode of the wireless communication apparatus.

Yet another aspect of the subject matter described in the disclosure provides a wireless communication apparatus. The wireless communication apparatus includes means for receiving an indication of at least one of priority levels of data for each one of a plurality of transmit circuits and a detected operating mode of the wireless communication apparatus, each of the plurality of transmit circuits being configured to transmit according to a different radio access technology. The wireless communication apparatus further includes means for selectively switching each of the transmit circuits of the plurality of transmit circuits to transmit wireless communications via a corresponding one of a plurality of antennas based on the priority levels of data for each of the transmit circuits and the detected operating mode of the wireless communication apparatus.

Another aspect of the subject matter described in the disclosure provides a computer program product. The computer program product includes a computer readable medium. The computer readable medium includes code for receiving an indication of at least one of priority levels of data for each one of a plurality of transmit circuits and a detected operating mode of the wireless communication apparatus, each of the plurality of transmit circuits being configured to transmit according to a different radio access technology. The computer readable medium further includes code for selectively switching each of the transmit circuits of the plurality of transmit circuits to transmit wireless communications via a corresponding one of a plurality of antennas based on the priority levels of data for each of the transmit circuits and the detected operating mode of the wireless communication apparatus.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIGS. 7A-7B show examples of two exemplary look up tables which may be used to determine a transmission power limit according to a device state index in accordance with some embodiments.

FIG. 8 provides an example of a portion of a look up table for determining transmission power limits for a given radio access technology type, antenna, a band-class, a configuration, and an uplink channel in accordance with some embodiments.

Figure 1:
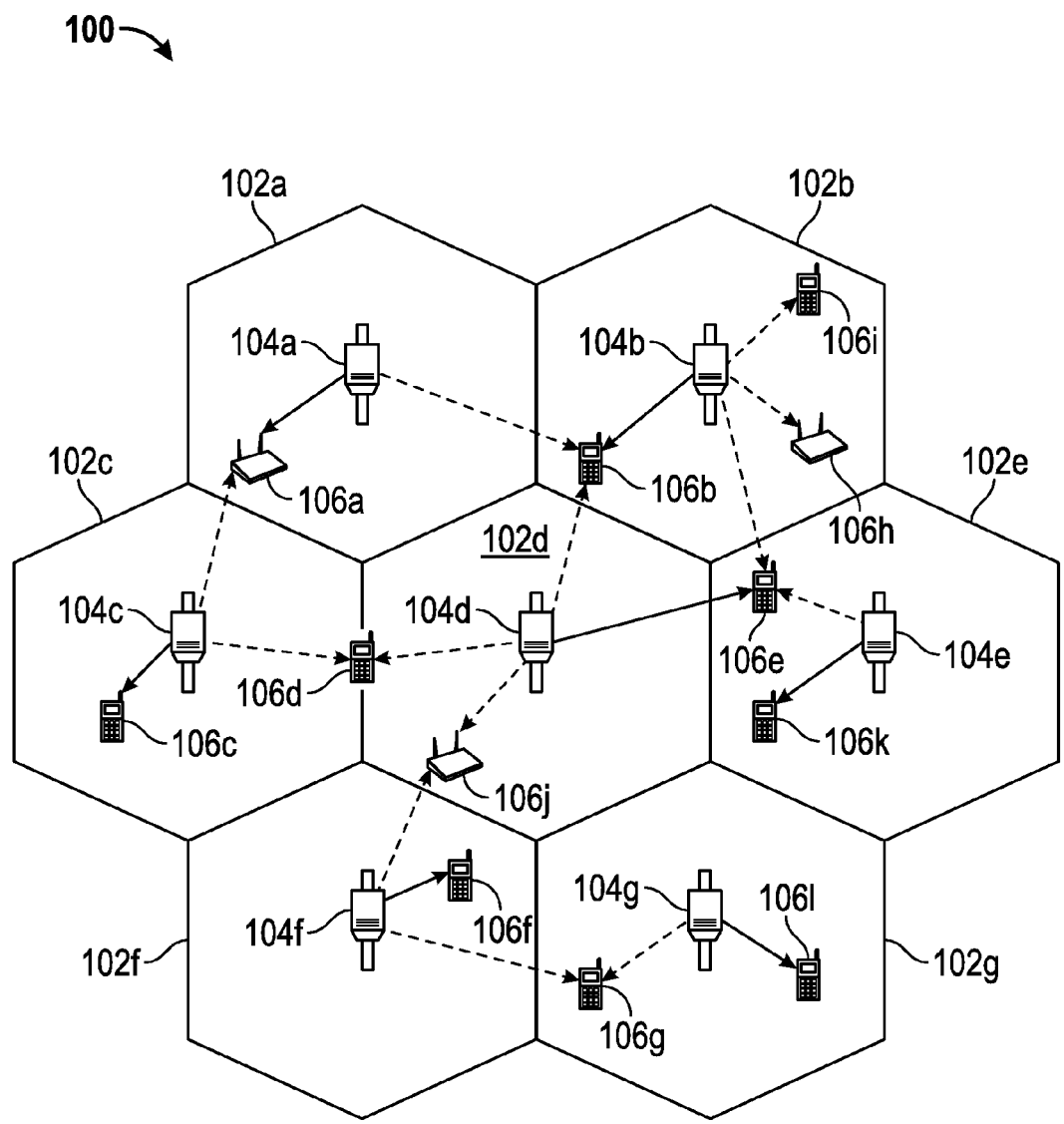
FIG. 1 shows an example of a simplified diagram of a wireless communication system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Like reference numerals may be used to denote like features throughout the specification and figures.

DETAILED DESCRIPTION

Various aspects of embodiments within the scope of the appended claims are described below. It should be apparent that the aspects described herein may be implemented in a wide variety of forms and that any specific structure and/or function described herein is merely illustrative. Based on the present disclosure a person/one having ordinary skill in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM", etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 and EV-DO are described in documents from an organization named "3rd Generation Partnership Project 2" (3GPP2). These various radio technologies and standards are known in the art.

The techniques described herein may further be used with various modes associated with different radio access technologies such as simultaneous voice and data modes that allow simultaneously sending and receiving voice and non-voice data. For example, Simultaneous 1x Voice and EV-DO Data (SVDO) and Simultaneous 1x and LTE (SVLTE) modes may be employed in various embodiments.

Single carrier frequency division multiple access (SC-FDMA), which utilizes single carrier modulation and frequency domain equalization is one technique used in a wireless communication system. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

FIG. 1 illustrates an exemplary wireless communication network 100 in accordance with some embodiments. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104 (e.g., base stations), such as, for example, nodes 104a-104g. Each node 104 may provide communication coverage to a corresponding cell 102. The nodes 104 may interact with a plurality of access terminals (ATs), such as, for example, ATs 106a-106l. For ease of reference, ATs 106a-106l may be referred to hereinafter as an access terminal 106.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. Further, the RL may also be referred to as the uplink. The nodes 104 may be interconnected, for example, by appropriate wired or wireless interfaces and may be able to communicate with each other. Accordingly, each AT 106 may communicate with another AT 106 through one or more nodes 104.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide an access terminal (AT) 106 access within its coverage area to another communications network, such as, for example the internet or another cellular network.

An AT 106 may be a wireless communication device (e.g., a mobile phone, router, personal computer, server, etc.) used by a user to send and receive voice or data over a communications network. An access terminal (AT) 106 may also be referred to herein as a user equipment (UE), as a mobile station (MS), or as a terminal device. As shown, ATs 106a, 106h, and 106j comprise routers. ATs 106b-106g, 106i, 106k, and 106l comprise mobile phones. However, each of ATs 106a-106l may comprise any suitable communication device.

An access terminal 106 may be multimode, capable of operating using different radio access technologies (RATs) such as radio access technologies defined by standards such as cdma2000 1x, 1x-EV-DO, LTE, eHRPD, 802.11, and the like. An access terminal 106 may perform a plurality of tasks across various communication systems using different radio access technologies. The communication may be accomplished using a plurality of collocated transmitters or may be communicated using one single transmitter.

Figure 2:
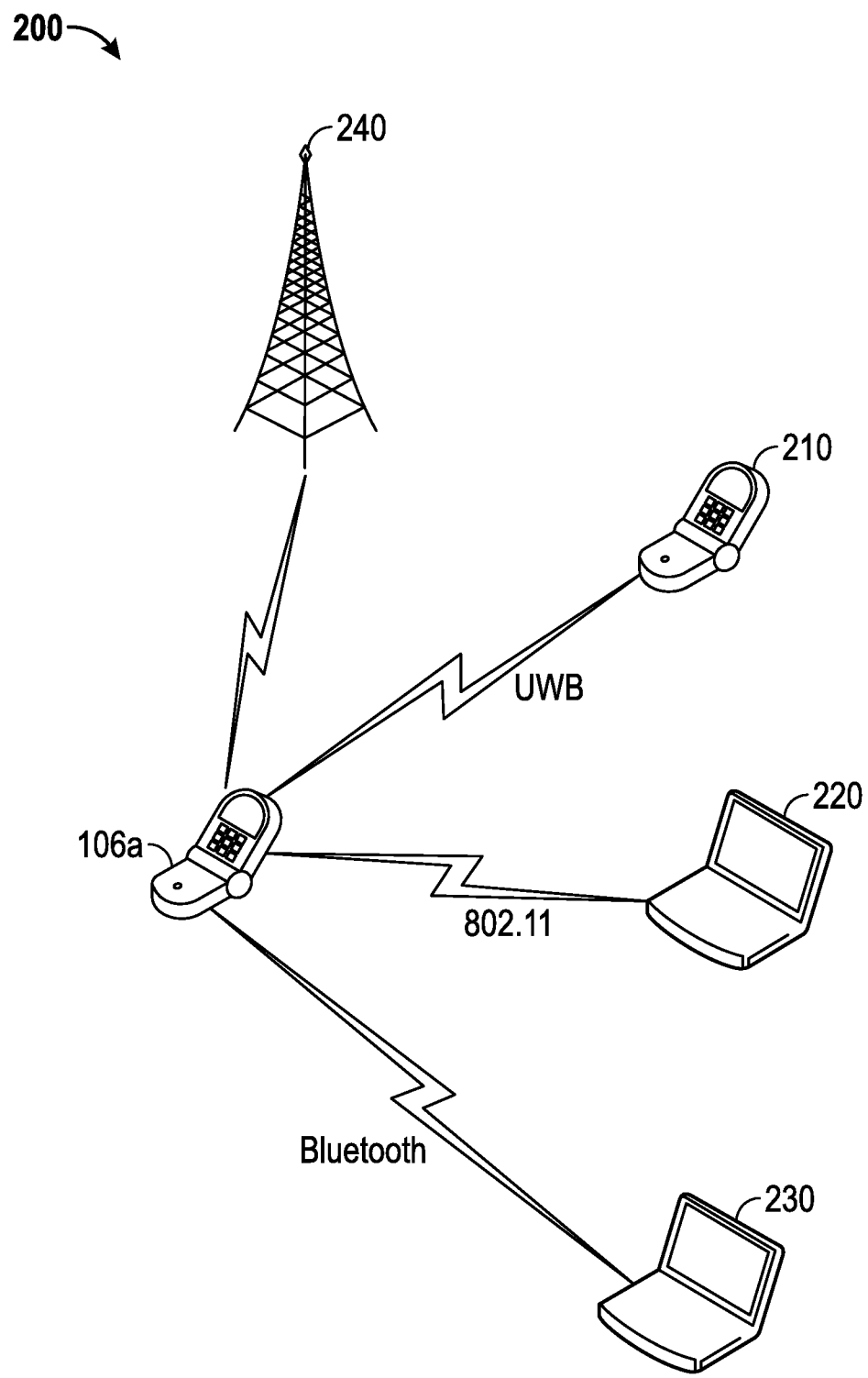
FIG. 2 shows an example of a functional block diagram of an exemplary mobile device operating in a wireless communication network in accordance with some embodiments.

FIG. 2 shows an example of a functional block diagram of an exemplary access terminal 106 operating in a wireless communication network 200 in accordance with some embodiments. The wireless communication network 200 comprises the access terminal 106, a second wireless communications device 210, a third wireless communications device 220, a fourth wireless communications device 230, and a cellular tower 240. The wireless communication network 200 may be configured to support communication between a multitude of devices, such as the wireless communications devices 106a, 210, 220, 230, and tower 240. The mobile wireless communications devices (e.g., 106a, 210, and 220) may comprise, for example, personal computers, PDAs, music players, video players, multimedia players, televisions, electronic game systems, digital cameras, video camcorders, watches, remote controls, headsets, and so on. Access terminal 106 may be simultaneously in communication with each of devices 210, 220, 230, and 240 via one or more transmitters collocated on access terminal 106.

With continuing reference to FIG. 2, the access terminal 106 may communicate with other wireless communications devices (e.g., 210, 220) over a variety of communication channels. The communication channels may comprise Ultra-Wide Band (UWB) channels, Bluetooth channels, 802.11 channels (e.g., 802.11a, 802.11b, 802.11g, and 802.11n), infrared (IR) channels, ZigBee (802.15) channels, or a variety of other channels, as is well known in the art. In one embodiment, the channel may be a UWB channel conforming to the ECMA-368 standard. Other channels would be readily recognized as possible as well.

The wireless communications network 200 may comprise a wireless local area network (WLAN) covering a physical area, like a home, office, or a group of buildings. A WLAN may use standards such as, 802.11 standard (e.g., 802.11g), and/or other standards for wireless communications. A WLAN may use peer-to-peer communication in which the wireless communication devices directly communicate with each other. The wireless communications network 200 may also comprise a wireless personal area network (WPAN), spanning, for example, an area of a few meters. A WPAN may use standards such as infrared, Bluetooth, a WiMedia based UWB standard (e.g., ECMA-368), and ZigBee standards, and/or other standards for wireless communications. A WPAN may use peer-to-peer communication in which the wireless communication devices directly communicate with each other. The wireless communications network 200 may also comprise a wide wireless area network (WWAN). The WWAN may use standards such as cdma2000 1x, 1x-EV-DO, LTE, eHRPD and the like. The access terminal 106 may connect to another network, such as a wireless communications network or the Internet, through network 200. The messages sent across the wireless communications network 200 may comprise information related to various types of communication (e.g., voice, data, multimedia services, etc.) and may be of varied degrees of importance to the user of access terminal 106, as described in greater detail below.

Although the following embodiments may refer to FIG. 1 or 2, one will recognize that they are readily applicable to other communication standards. For example, one embodiment may be applicable in a UMTS communication system. Some embodiments may be applicable in an OFDMA communication system. The communication system 200 may further comprise any type of communication system including, but not limited to, a code division multiple access (CDMA) system, a global system for mobile communication system (GSM), a wideband code division multiple access (WCDMA), and an OFDM system.

Figure 3:
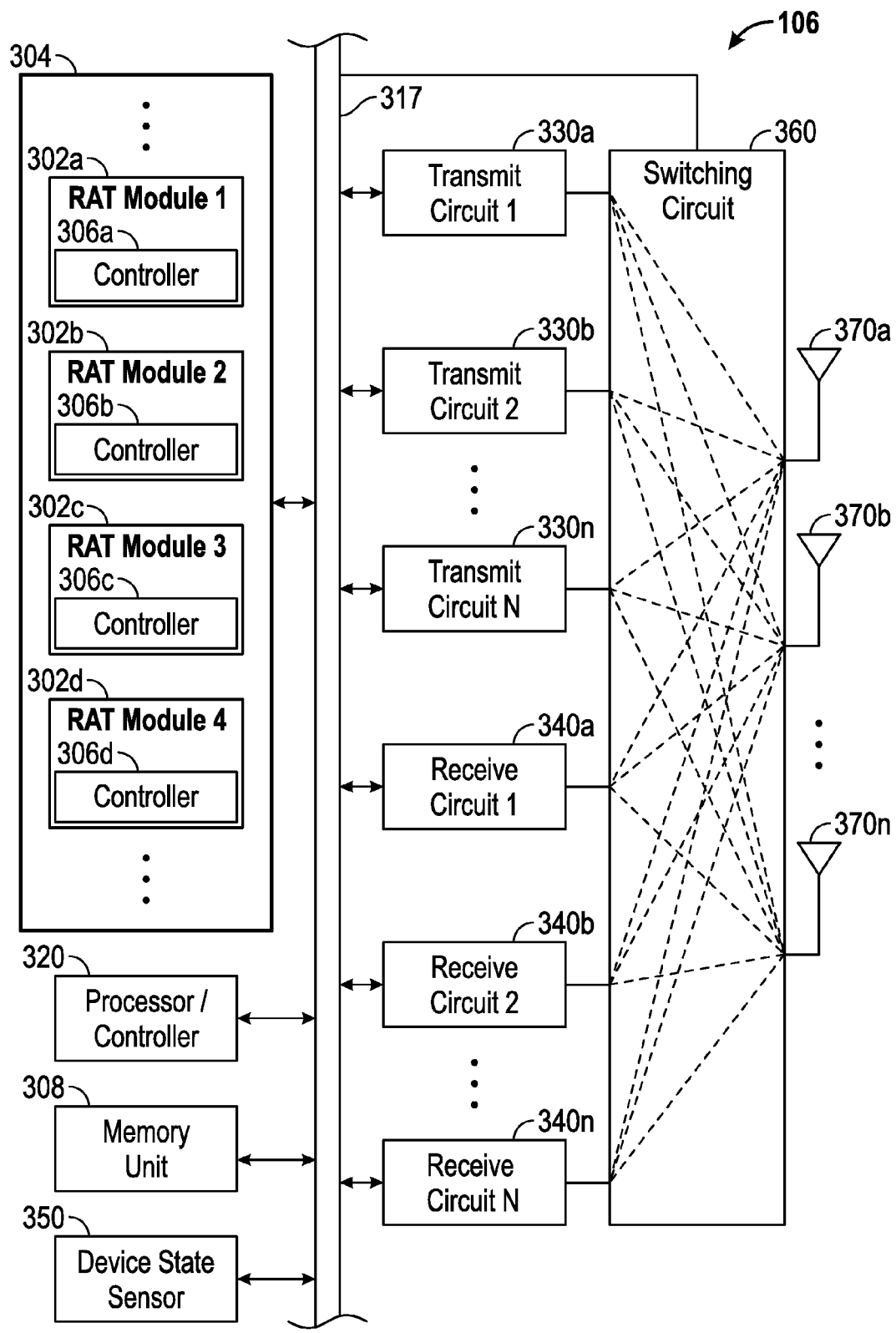
FIG. 3 shows an example of a functional block diagram of an exemplary access terminal shown in FIGS. 1 and 2 in accordance with some embodiments.

FIG. 3 shows an example of a functional block diagram of an exemplary access terminal 106 shown in FIGS. 1 and 2 in accordance with some embodiments. The access terminal 106 may be multimode, capable of operating using different radio access technologies (RATs) such as any of the radio technologies mentioned above with reference to FIGS. 1 and 2. The access terminal 106 is an example of a device that may be configured to implement the various methods described herein. The access terminal 106 may implement any of the devices illustrated in FIGS. 1-2.

The access terminal 106 includes a central data bus 317 linking several circuits together. The circuits include a controller/processor 320, a memory unit 308, and RAT circuitry 304 which may include various radio access technology modules such as modules 302a, 302b, 302c, and 302d. The processor/controller 320 may comprise or be a component of a processing system implemented with one or more processors. The processor/controller 320 may be configured as or referred to as an application processor 320 in some embodiments. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

In addition, the processor/controller 320 may be configured to communicate with and control the operation of various modules configured for different radio access technologies (RATs). Each of modules 302a, 302b, 302c, and 302d may implement a specific radio access technology and may each individually include additional memory modules, communication components and functions which are applicable to the radio access technology type implemented by the module. Each module 302a, 302b, 302c, and 302d may further include a controller 306a, 306b, 306c, and 306d which may each also be referred to herein as a modem processor 306a, 306b, 306c, and 306d that may be used to control the operation of each RAT. For ease of reference, controllers 306a, 306b, 306c, and 306d may hereinafter be referred to as a RAT controller 306. Furthermore RAT controllers 306a, 306b, 306c, and 306d may be provided independently of each module 302a, 302b, 302c, and 302d for controlling the modules. In some embodiments, the processor 320 may be configured to perform the functions of the RAT controller 306. Furthermore, each RAT may include its own transceiver(s) including antenna(s) (not shown). The RAT modules may implement any of the RAT types discussed above with reference to FIGS. 1-2 or other readily recognizable RAT types.

The access terminal 106 further comprises one or more transmit circuits 330a, 330b, and 330n. Transmit circuits 330a, 330b, and 330n may also be referred to as transmit chains having one or more components configured to transmit wireless communications via an antenna 370a. For example, transmit circuit 330a may include a modulator (not shown), a digital-to-analog (D/A) converter (not shown), an amplifier (not shown) as well as other circuitry for modulating and preparing a wireless communications signal for transmission via an antenna 370a. In some cases, the RAT circuitry 304 may include transmit circuits 330a, 330b, and 330n where each RAT module 302a, 302b, 302c, and 302d may include one of transmit circuits 330a, 330b, and 330n. As such, transmit circuits 330a, 330b, and 330n may be configured to transmit according to a radio access technology associated with one of RAT modules 302a, 302b, 302c, and 302d. In some cases, the access terminal 106 may have one transmit circuit 330a. In other cases, one or more of transmit circuits 330a, 330b, and 330n may be activated or deactivated. In one aspect, the transmit circuits 330a may include components particular to one of the RAT modules 302a, 302b, 302c, and 302d. For example, a RAT module 302a may implement a wireless communications using OFDM, while a second RAT module 302b may implement a wireless communications using CDMA. As such, one transmit circuit 330a may include components configured for OFDM communications while a second transmit circuit 330b may include components configured CDMA communications.

The access terminal 106 further comprises one or more receive circuits 340a, 340b, and 340n. Receive circuits 340a, 340b, and 340n may also be referred to as receive chains having one or more components configured to receive wireless communications via an antenna 370a. For example, receive circuit 340a may include an amplifier (not shown), an analog-to-digital converter (not shown), a demodulator (not shown), as well as other circuitry for receiving and demodulating a wireless communications signal received via an antenna 370a. In some cases, the RAT circuitry 304 may include receive circuits 340a, 340b, and 340n where each RAT module 302a, 302b, 302c, and 302 may include one of receive circuits 340a, 340b, and 340n. As such, each of receive circuits 340a, 340b, and 340n may be configured to receive according to a radio access technology associated with one of the RAT modules 302a, 302b, 302c, and 302d. In some cases, the access terminal 106 may have one receive circuit 340a. In other cases one or more of the receive circuits 340a, 340b, and 340n may be activated or deactivated.

Transmit circuits 330a, 330b, and 330n may process and convert high-frequency (HF) signals to the base-band signals. Receive circuits 340a, 340b, and 340n in turn may process and buffer received signals before sending out to the data bus 317. Transmit circuits 330a, 330b, and 330n may process and buffer the data from the data bus 317 before sending out of the access terminal 106. The processor/controller 320 controls the proper timing by allocating the time slots for the data sensing and processing for the different frequency bands for transmit circuits 330a, 330b, and 330n and receive circuits 340a, 340b, and 340n.

Each of transmit circuits 330a, 330b, and 330n and receive circuits 340a, 340b, and 340n may be configured to respectively transmit and receive via one of several antennas 370a, 370b, and 370n. Individual transmit circuits 330a, 330b, and 330n and receive circuits 340a, 340b, and 340n may transmit and receive information associated with a different radio access technology via a particular antenna 370a, 370b, or 370n. For example, for simultaneous voice and data modes, one transmit circuit 330a may be used for transmitting voice data via antenna 370a while another transmit circuit 330b may be used for transmitting non-voice data via antenna 370b. Stated another way, a first transmit circuit 330a may be used for transmitting and receiving 1× voice data via antenna 370a while a second transmit circuit 330b may be used for data only (DO) LTE via antenna 370b. The processor/controller 320 directs the multiple transmit circuits 330a, 330b, and 330n and receive circuits 340a, 340b, and 340n for detecting and/or processing of signals from the different frequency bands via antennas 370a, 370b, and 370n. Antennas 370a, 370b, and 370n may be placed in different physical locations within the access terminal 106. For example, antennas 370a, 370b, and 370n may be at opposite (e.g., distal) ends or corners of the access terminal 106 or adjacent to each other. Generally, antennas 370a, 370b, and 370n can be located at similar or distinct places as desired or in accordance with device design.

A switching circuit 360 may be provided to allow a controller 320 to select antennas 370a, 370b, and 370n for which transmit circuits 330a, 330b, and 330n or receive circuits 340a, 340b, and 340n are configured to transmit and receive from. The switching circuit 360 may include circuitry configured to switch M inputs corresponding to transmit circuits 330a, 330b, and 330n and receive circuits 340a, 340b, and 340n to N outputs corresponding to antennas 370a, 370b, and 370n. As shown in FIG. 3, there may be more or less than three transmit circuits 330a, 330b, and 330n, three receive circuits 340a, 340b, and 340n, and three antennas 370a, 370b, and 370n. As one example, the switching circuit 360 may be configured as a crossbar switch or other suitable switching circuitry. The controller 320 may be configured to switch transmit circuits 330a, 330b, and 330n and receive circuits 340a, 340b, and 340n to respectively transmit and receive via any combination of antennas 370a, 370b, and 370n.

In some embodiments, transmit circuits 330a, 330b, and 330n can be implemented as an external circuit, such as an external modem, pluggable to the access terminal 106.

The processor/controller 320 performs the function of data management of the data bus 317 and the function of general data processing, including executing the instructional contents of the memory unit 308. The memory unit 308 may include a set of modules and/or instructions. Instructions particular to the process steps of the access terminal 106 as shown and described in the embodiments described below can be coded in the various functions included in the contents of the memory unit 308. In one embodiment, the memory unit 308 is a RAM (Random Access Memory) circuit. Some communication device functions, such as the handoff functions, are software routines, modules, and/or data sets. The memory unit 308 can be tied to another memory circuit (not shown) which either can be of the volatile or nonvolatile type. As an alternative, the memory unit 308 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. In addition, the memory unit 308 can be a combination of ASIC and memory circuitry of the volatile type and/or non-volatile type.

The access terminal 106 may further include a device state sensor 350. The device state sensor may be configured to detect one or more states or modes of a device according to how the device is being used, handled, and/or positioned. For example, the device state sensor 350 may be configured as a proximity sensor that may be configured to detect a proximity of the user or other object with respect to the access terminal 106. In one embodiment, the device state sensor 350 includes multiple proximity sensors. Each of the multiple proximity sensors are placed next to the antennas 370a, 370b, and 370n. Each of the multiple proximity sensors is configured to detect whether an object is in proximity (e.g., blocking) a respective antenna 370a, 370b, and 370n. The device state sensor 350 may further include and/or be configured as an orientation sensor such as an accelerometer that may be configured to detect the orientation of the access terminal 106 with respect to the user of the access terminal 106. The device state sensor 350 may further include and/or be configured as other types of sensors for detecting a temporary condition or state of the access terminal 106. While shown as one functional block, multiple device state sensors of different types may be included. Feedback from the device state sensor 350 may be indicative of a particular operating mode of the access terminal 106.

In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, modules, units, blocks, and the like, such as shown and described in FIG. 3.

Although described separately, it is to be appreciated that functional blocks described with respect to the access terminal 106 need not be separate structural elements. For example, the processor 320, the memory unit 308, and RAT modules 302a, 302b, 302c, and 302d may be embodied on a single chip. The processor 320 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

Figure 4:
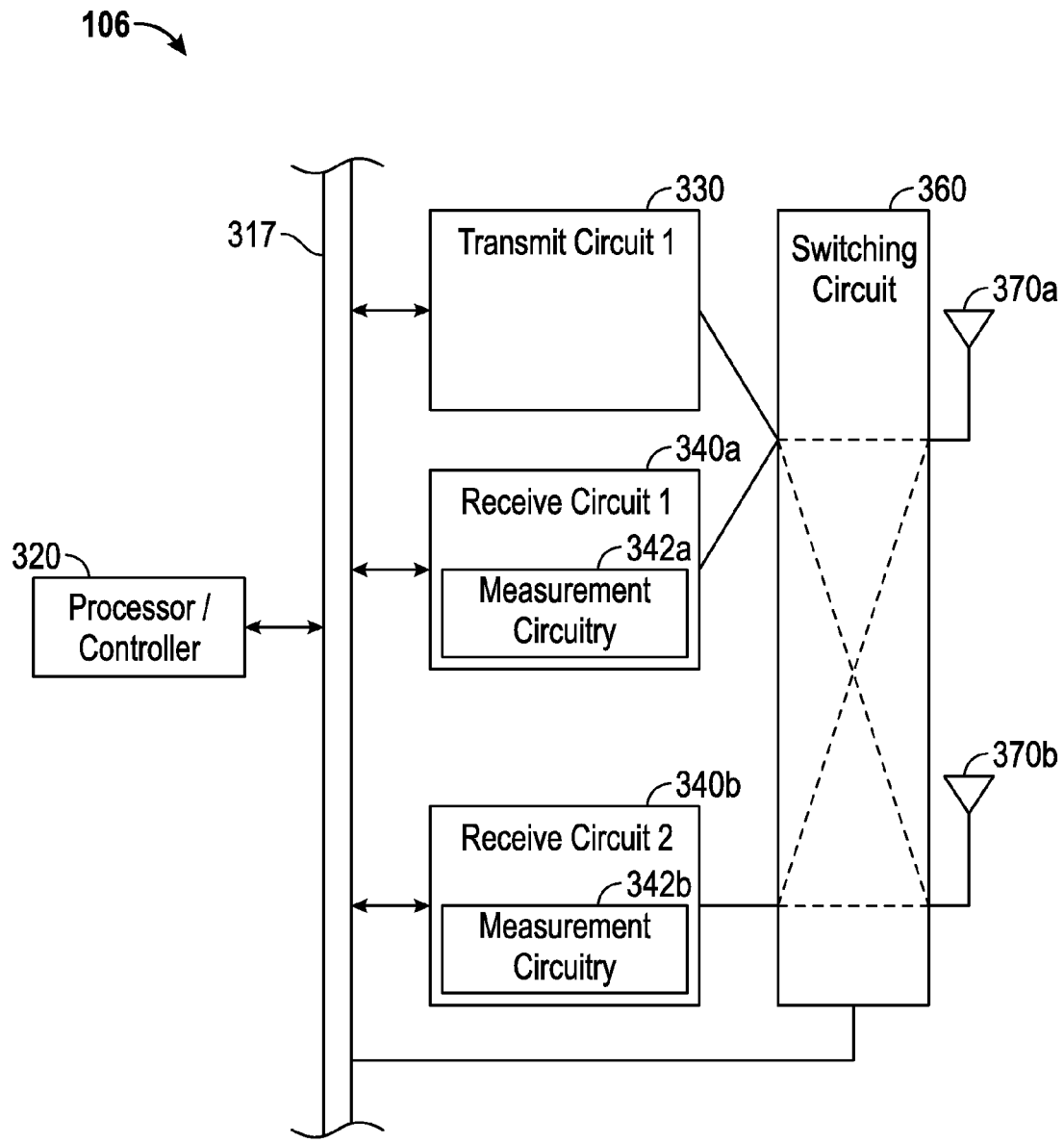
FIG. 4 is a functional block diagram of a portion of the access terminal shown in FIG. 3 in accordance with some embodiments.

FIG. 4 is a functional block diagram of a portion of the access terminal 106 shown in FIG. 3 in accordance with some embodiments. With reference to FIG. 4, in some cases, only one transmit circuit 330 may be active. In other words, the access terminal 106 may be in a mode configured for using a single transmit circuit 330. In some cases, this mode may correspond to a single RAT module 302a, 302b, 302c, and 302d being active. As shown in FIG. 4, the controller 320 may be configured to switch the transmit circuit 330 to communicate via either a first antenna 370a or a second antenna 370b. In addition, a receive circuit 340a may be associated with the transmit circuit 330 in that the receive circuit 340a is configured to communicate via the same antenna 370a or 370b used by the transmit circuit 330. As such, the controller 320 may be configured to switch the transmit circuit 330 and receive circuit 340a to respectively transmit and receive via the first antenna 370a or the second antenna 370b. Stated another way, the first receive circuit 340a is configured to be switched alongside the transmit circuit 330. In addition, a second receive circuit 340b may be configured to communicate via either the antenna 370a or 370b that is not being used for the transmit circuit 330 and the first receive circuit 340a. The first receive circuit 340a and second receive circuit 340b may include measurement circuitry 342a and 342b configured to measure receive power levels. As one example, the measurement circuitry 342a and 342b may be configured to gather receive automatic gain control (AGC) measurements.

As described above, multiple transmit circuits 330a, 330b, and 330c may simultaneously transmit using multiple antennas 370a, 370b, and 370n. However, the performance of one antenna 370b may be better than another antenna 370b based on any one of a number of factors that may be related to, but not limited to, the arrangements of the antennas on the access terminal 106, the proximity of external objects to the antennas 370a, 370b, and 370c, or inherent antenna characteristics. Furthermore, during operation, certain transmit circuits 330a, 330b, and 330c may have different data transmission priorities or transmit power preferences. Certain aspects of various embodiments described herein are directed to switching transmit circuits 330a, 330b, and 330c for transmitting via different antennas 370a, 370b, and 370n to improve performance of an access terminal 106. For example, it may be desirable for the transmit circuit 330a transmitting the highest priority data to transmit via the antenna 370a having the best performance. In addition, other transmit circuit power requirements may result in improved performance if a transmit circuit 330a is coupled to the highest performing antenna 330b. As operation of the access terminal 106 may affect antenna performance, it may be desirable to have dynamic systems and methods for coupling transmit circuits 330a, 330b, and 330c to antennas 370a, 370b, and 370n as provided by embodiments described herein.

With reference to FIGS. 3 and 4, certain operating conditions may result in one or more of antennas 370a, 370b, and 370n being de-sensed or otherwise resulting in a reduced performance. For example, the hand of a user may be wrapped around the access terminal 106 effectively blocking one or more of antennas 370a, 370b, and 370n. Or the access terminal 106 may be positioned such that antennas 370a, 370b, and 370n may operate with less than ideal receive conditions. These scenarios may reduce power levels of received signals thus making it more difficult to receive and demodulate signals. Blocking one or more of antennas 370a, 370b, and 370n may also reduce the total signal strength such that transmit circuits 330a, 330b, and 330n may need to increase power levels. However, with respect to increased transmit power levels, an access terminal 106 may be subject to regulatory radio frequency (RF) safety requirements. The access terminal 106 may be required to operate within specific guidelines before entering the market. For example, devices operating near the human body are evaluated to determine the Specific Absorption Rate ("SAR") their electromagnetic waves produce. SAR is the time-rate of electromagnetic energy absorption per unit of mass in a lossy media, and may be expressed as:

$$SAR(r) = \frac{\sigma(r)}{\rho(r)}|E(r)|^2_{rms} \quad \text{(Equation 1)}$$

Where E(r) is the exogenous electric field at point r, while σ(r) and ρ(r) are the corresponding equivalent electrical conductivity and mass density, respectively. In one aspect, these safety guidelines may limit the amount of transmit power levels.

Generally, SAR testing evaluates the amount of energy absorbed into the body from such devices with a single or multiple transmitters. Under one requirement, devices operating at distances beyond 20 cm may be evaluated through a maximum permissible exposure ("MPE") calculation or measurement. As such, when an one or more antennas 370a, 370b, and 370n are blocked by a human hand or other body part, the maximum transmit power level allowed to avoid exceeding SAR limits may be significantly reduced.

Other operating conditions depending on the position of the access terminal 106 with respect to a user or other objects may further reduce performance due to antenna blocking. In addition, certain operating modes (e.g., using an access terminal 106 as a hotspot) may require increased power levels which may further impact regulatory limits.

To account for the various operating conditions in addition to other factors, certain aspects of certain embodiments described herein are directed to providing transmit antenna selection diversity to maximize access terminal 106 performance for different operating modes and concurrent communication using multiple radio access technologies. In one embodiment, this may mitigate hand/body blocking and allow for selecting antennas in such a way to meet regulatory limits at the least cost to performance and/or to enable good receive conditions. Furthermore, in one aspect, transmit antenna selection diversity may further be provided to mitigate interference issues. Stated another way, embodiments may be directed to providing transmit antenna selection diversity to provide a target quality of service for the least amount of transmit power.

In accordance with one embodiment, the controller 320 may be configured to perform autonomous selection to dynamically determine mapping between transmit circuits 330a, 330b, and 330n and antennas 370a, 370b, and 370n as will be further described below. In another embodiment, there may be a pre-determined mapping between transmit circuits 330a, 330b, and 330n and antennas 370a, 370b, and 370n as will be further described below.

With reference to FIG. 3, in cases for multiple transmit circuits 330a, 330b, and 330n transmitting according to multiple RATs, a mapping may be provided between transmit circuits 330a, 330b, and 330n and antennas 370a, 370b, and 370n. Mappings for antennas 370a, 370b, and 370n may be dependent on a certain operating mode of the access terminal 106 as described above. The operating mode may correspond to, for example, the proximity of a user to the access terminal 106. Similarly, an operating mode may correspond to the detected orientation of a device. As also mentioned above, an operating mode may correspond to whether a certain communication feature of the access terminal 106, such as using the access terminal 106 as a mobile hotspot, is activated. Furthermore, any combination of the operating modes described above may map to another operating mode. For example, an access terminal's 106a mobile hotspot may be activated simultaneously while the user is using the access terminal 106 on a phone call and placing the phone next to the user's ear. The operating modes described above are exemplary. Any other operating modes which may affect antenna and/or device performance may be detected and used to map different antennas 370a, 370b, and 370n to different transmit circuits 330a, 330b, and 330n. As described above, the device state sensor 350 may include proximity sensors located next to each of the antennas 370a, 370b, and 370n. The operating mode may be based on which of the antennas 370a, 370b, and 370n are blocked using state information from the proximity sensors. In one embodiment, the proximity sensors may be capacitive proximity sensors.

To manage difference operating modes, a determined number of operating mode indexes may be defined for operating modes of an access terminal 106. Each index may be described as a device state index (DSI). Each DSI may correspond to some operating mode or combination of operating modes detected by the access terminal 106.

The mapping between transmit circuits 330a, 330b, and 330n and antennas 370a, 370b, and 370n may further depend on which of transmit circuits 330a, 330b, and 330n are active. In addition, transmit circuits 330a, 330b, and 330n may operate according to a priority scheme where a first transmit circuit 330a may have priority over a second transmit circuit 330b and so on. The priorities of each transmit circuit 330a may change during operation, for example depending on the type of data being transmitted. For example, if one transmit circuit 330a happens to be transmitting voice data during a time period in which another transmit circuit 330b is transmitting data only, the transmit circuit 330a may be assigned a higher priority that the other transmit circuit 330b during this time interval. During another time interval, the opposite could occur.

The mapping between transmit circuits 330a, 330b, and 330n and antennas 370a, 370b, and 370n may therefore further depend on which transmit circuit 330a has priority. For example, the transmit circuit 330a with the highest priority may be able to transmit using an antenna 370a that will provide the highest performance. The mapping may further depend on the operating mode which may indicate which antennas 370a, 370b, or 370n are blocked or will perform better according to detected states (e.g., if a proximity sensor indicates that antenna 370a is blocked while antenna 370b is not blocked). Furthermore, depending on the device state, transmit circuits 330a, 330b, and 330n may have various preferences for certain antennas 370a, 370b, and 370n that may be taken into account for the mapping. It should be appreciated that as transmit circuits 330a, 330b, and 330n may be associated with a particular radio access technology, the radio access technology type may determine the priorities and preferences of antennas 370a, 370b, and 370n.

In addition, each transmit circuit 330a that is associated with a radio access technology module 302 may have a preference for different antenna 370a, 370b, and 370n based on the type of data transmitted or based on transmit power needs and safety regulations. As such, the mapping between transmit circuits 330a, 330b, and 330n may further depend on antenna preferences for different operating modes.

As such, the mapping between transmit circuits 330a, 330b, and 330n and antennas 370a, 370b, and 370n may be based on the operating mode, the current set of active transmitters, and priorities for transmission. The mapping of transmit circuits 330a, 330b, and 330n and antennas 370a, 370b, and 370n for each possible combination of operating mode, transmit circuit priorities, and active transmit circuits may be provided. The mapping for each combination may be stored in memory, such as memory unit 308. As such, a change in any of the operating mode, set of active transmit circuits 330a, 330b, and 330n, or priority scheme may trigger a controller 320 to determine the resulting pre-stored mapping based on the combination of operating mode, priority scheme, and identity of active transmit circuits 330a, 330b, and 330n, etc. Stated another way, in one embodiment, rather than autonomously determining an optimal mapping between transmit circuits 330a, 330b, and 330n and antennas 370a, 370b, and 370n, all mapping may be pre-determined and stored. The controller 320 used the pre-determined mapping to switch devices after the controller 320 detects the current set of active transmit circuits 330a, 330b, and 330n, the transmission priorities of the transmit circuits 330a, 330b, and 330n, and the operating mode. In one aspect, this may allow for an embodiment that may avoid a need to determine an autonomous procedure for switching transmit circuits 330a, 330b, and 330c to antennas 370a, 370b, and 370n. This may provide improved performance and reduced complexity as compared to increased complexity needed to provide an autonomous determination as the number of antennas and concurrent transmit circuits rises. As such, certain embodiments described herein contemplate a pre-determined mapping of transmit circuits 330a, 330b, and 330n to antennas 370a, 370b, and 370n based on various detected operating conditions.

Figure 5:
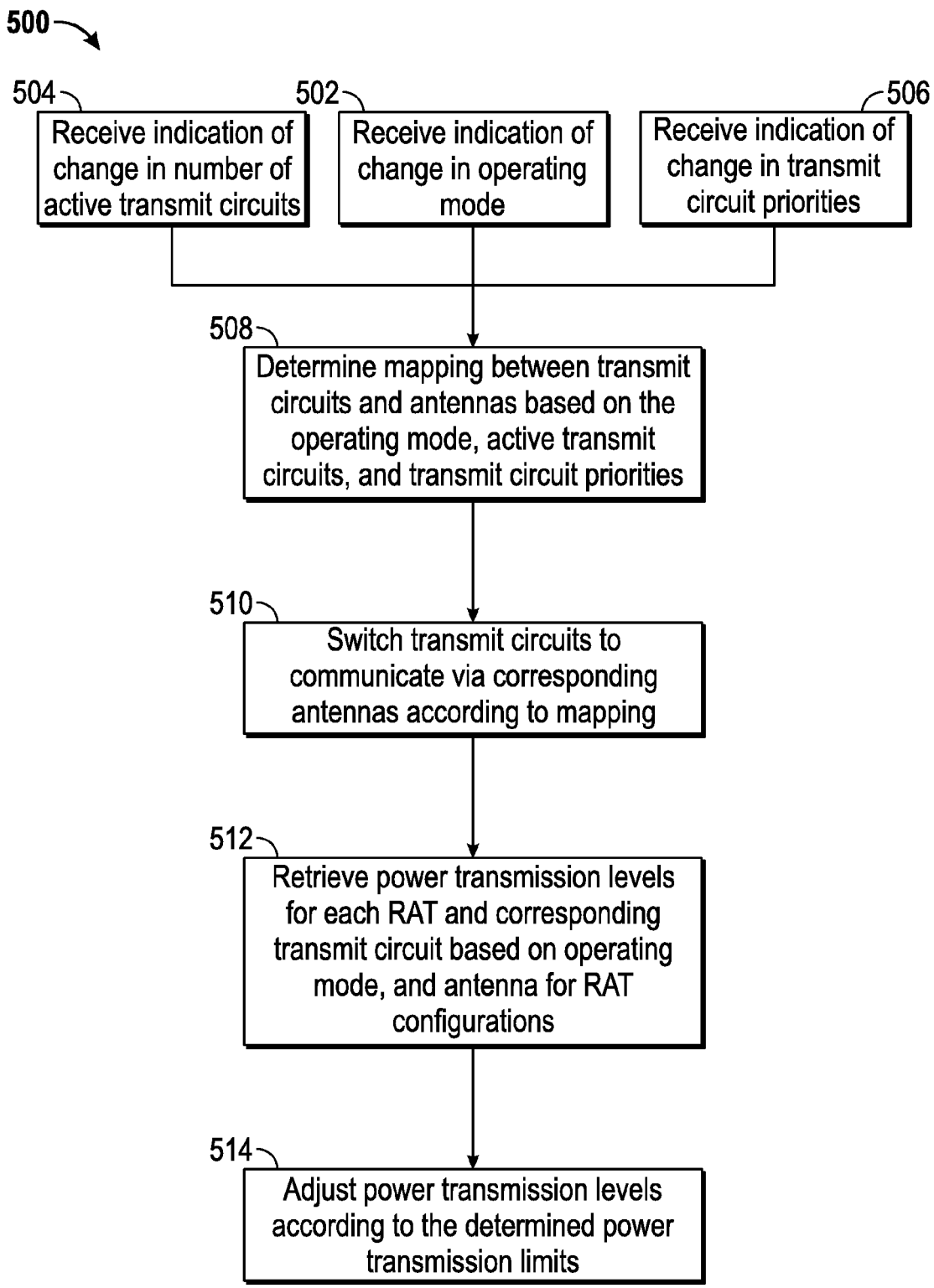
FIG. 5 is a flowchart of an implementation of an exemplary method for determining a mapping of transmit circuits to antennas in accordance with some embodiments.

FIG. 5 is a flowchart of an implementation of an exemplary method for selecting which transmit circuits 330a, 330b, and 330n transmit via which antennas 370a, 370b, and 370n in accordance with some embodiments. The need to switch the transmit circuits 330a, 330b, and 330n to different antennas 370a, 370b, and 370n may be determined/re-evaluated in response to a controller 320 receiving at least one of an indication of a change in the number or set of active transmit circuits 330a, 330b, and 330n; an indication of a change in an operating mode (e.g., a change in device state index); and/or an indication of a change in transmit circuit priorities as shown in blocks 502, 504, and 506. Upon receiving an indication of the change, the controller 320 may switch the transmit circuits 330a, 330b, and 330n to transmit via selected antennas 370a, 370b, and 370n, based on the stored mapping according to the operating mode, the identity of the active transmit circuits 330a, 330b, and 330n, and transmit circuit priorities as shown in block 508. Each mapping may be provided to maximize antenna/transmit circuit performance. In addition, the mappings may be further based on some performance characteristic. For example, the performance characteristic may include one or more of a transmit power level of at least one of the plurality of transmit circuits 330a, 330b, and 330n, an amount of interference between at least two antennas 370a and 370b of the plurality of antennas, a target quality of service level for at least one of the transmit circuits, or a regulatory requirement for a transmit power level for at least one of the transmit circuits, any combination thereof.

As mentioned above, mapping data or information may be stored in memory, such as memory unit 308. For example, look up tables for the various combinations of operating modes, priority schemes, and active transmit circuits 330a, 330b, and 330n may be provided. In response to a change in operating mode, priority, or active transmit circuit 330a, 330b, and 330n, if a switch between transmit circuits 330a, 330b, and 330n and 370a, 370b, and 370n is needed based on a mapping, in block 510, the controller 320 may switch transmit circuits 330a, 330b, and 330n to communicate via corresponding antennas 370a, 370b, and 370n based on the determined mapping. In an embodiment, the controller 320 may control the switching circuit 360 to switch and connect transmit circuits 330a, 330b, and 330n to their respective antennas 370a, 370b, and 370n based on the determined mapping.

The stored mapping between transmit circuits 330a, 330b, and 330n and antennas 370a, 370b, and 370n may be determined by the industrial design of the device before operation by a user. For example, the mapping may be determined by the particularly chosen spatial arrangement of the antennas 370a, 370b, and 370n with respect to the device or the placement of device/antennas 370a, 370b, and 370n relative to the user. In addition the mapping may be based on characteristics of the antennas 370a, 370b, and 370n. For example, the characteristics may include different efficiencies and/or radiated performance of the antennas 370a, 370b, and 370n. The mapping may further be based on wireless wide area network (WWAN) scenarios such as for voice only, data only, or simultaneous voice and data. Additionally, priorities such as voice having higher priority than data may also be used to determine the mapping. As a portion of the mapping is determined prior to run-time, complexity of a dynamic mapping scheme may be reduced.

The pre-configured mapping may take into account a variety of different combinations of operating conditions. As one example a predetermined mapping to select an antenna 370a, 370b, or 370n for a transmit circuit 330a, 330b, and 330n associated with a RAT module 302a may be based on a pre-tested scenario in which one out of two antenna 370a and 370b is blocked (e.g., detected via the proximity sensors), the device is performing concurrent voice and data with voice having a higher priority than data, and where both antennas support voice and data. The pre-determined mapping would indicate that the voice data would use antenna 370a that is not blocked while the non-voice data would use antenna 370b. This mapping would be triggered based on the controller 320 detecting this condition.

Once the mapping is configured, transmit power limits for each of antennas 370a, 370b, and 370n may be determined. Transmit power limits may be provided for each combination of mappings to achieve SAR compliance, for other reasons, or as desired. As will be described in further detail below, each particular configuration of a RAT may determine different transmit power limits. As such, in block 512 a controller 320 may retrieve power transmission limits for each RAT and corresponding transmit circuit 330a, 330b, or 330n, based on the operating mode, antenna being used, and/or particular RAT configuration. In one aspect, the controller 306 for each RAT module 302a, 302b, 302c, and 302d may retrieve the power transmission limits for the particular RAT. In block 514 the controller 320 (or controller for each RAT 306) may adjust power transmission levels according to the power transmission limits.

In accordance with blocks 512 and 514 of FIG. 5, in some embodiments, an access terminal 106 may provide the operating mode indicated by a DSI as an index to a look up table (LUT) which specifies transmission power limits based on the operating mode, the antenna used, and current state of the RAT being used. For example, transmission power limits may be determined for each DSI based on each RAT type, the antenna 370a, 370b, and 370n used, each band-class of the RAT type, each configuration of the RAT (e.g., modulation type), for certain channels of the RAT, etc. Similar mappings are further described in Applicant's co-pending patent application Ser. No. 13/411,392 entitled SYSTEMS AND METHODS FOR DYNAMIC TRANSMISSION POWER LIMIT BACK-OFF FOR SPECIFIC ABSORPTION RATE COMPLIANCE, filed Mar. 2, 2012, which is hereby incorporated by reference in its entirety. In addition to what is described in the mentioned co-pending application, the power transmission limits may further depend on the antenna 370a, 370b, and 370n being used.

Figure 6:
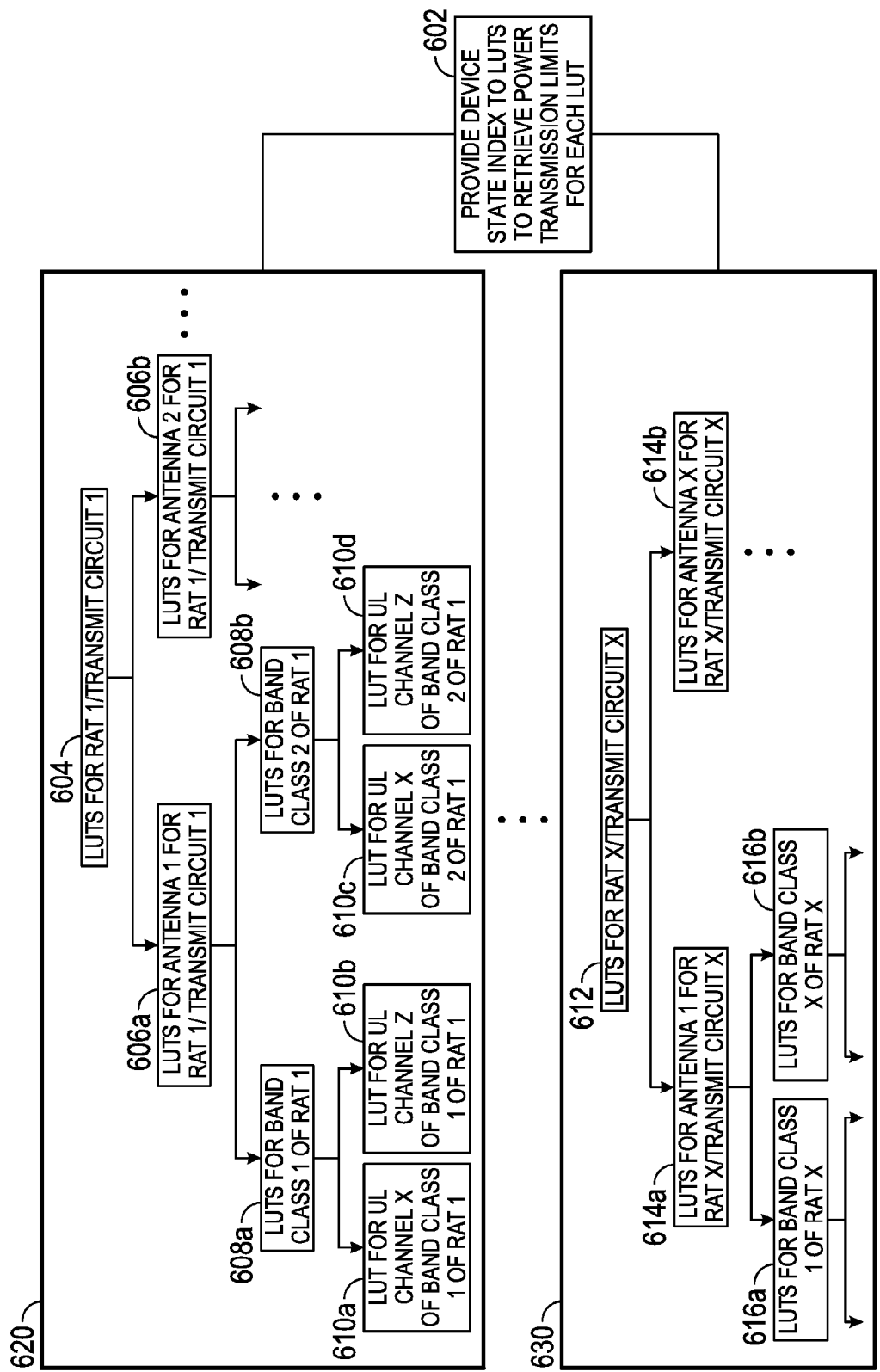
FIG. 6 shows an example of different groups of LUTs for different RAT types to provide an example of the different possible transmission power levels provided per a device state illustrating different groups of look-up tables for different radio access technology types in accordance with some embodiments.

For example, FIG. 6 shows an example of different groups of LUTs for different RAT types to provide an example of the different possible transmission power levels provided per a device state in accordance with some embodiments. In FIG. 6, at block 602, a device state index is provided to the LUTs for each RAT and corresponding transmit circuit 330a, 330b, and 330n. In block 620, the group of LUTs 604 corresponds to power transmission levels associated with a first RAT/transmit circuit 330a, 330b, or 330n. A group of LUTS for each antenna 370a, 370b, and 370n for the particular RAT/transmit circuit 330a, 330b, or 330n is further provided as shown in blocks 606a and 606b. A group of LUTs per band-class of the RAT and each antenna 370a, 370b, and 370n is further provided as shown in blocks 608a and 608b. Furthermore, in the example shown in FIG. 6, a LUT is then provided for each uplink channel of each band-class of the RAT as shown in blocks 610a-610d. The LUTs are provided for any number of RAT technology types for which an access terminal 106 may support. In block 630, the group of LUTs 612 corresponds to power transmission levels associated with RAT X/transmit circuit X. A group of LUTs for each antenna 370a 370b, or 370n is further provided for RAT X/Transmit circuit X as shown in blocks 614. A group of LUTs per band-class of RAT X is further provided as shown in blocks 616a and 616b. Furthermore, a LUT may then be provided for each uplink channel of each band-class of the RAT. Furthermore, many other communication parameters/characteristics may be provided which correspond to LUTs. For example, other characteristics may include a modulation type, a transmission state (e.g., traffic versus system access), an uplink channel, a call type, or the like as will be further described below. In addition, each type of RAT may have more or less LUTs according to the attributes and characteristics specific to each RAT type. Other communication characteristics/parameters may also have corresponding LUTs as may be determined by a person/one having ordinary skill in the art and which will be further described below.

FIGS. 7A-7B show examples of two exemplary look up tables 700a and 700b which may be used to determine a transmission power limit according to a device state index. FIG. 7A shows an example showing a LUT 700a corresponding to nine possible device state index values (corresponding to different operating modes), each of which is associated with a different transmission power limit in accordance with some embodiments. The LUT 700a in FIG. 7A may correspond to a LUT 700a for a given RAT, antenna, band-class, configuration, RAT transmission state, call type, and device mode. Each combination of a given RAT, antenna, band-class, configuration, RAT transmission state, call type, device mode, or any other characteristic affecting transmission power such as temperature, may correspond to a different LUT 700a with different values. Furthermore a DSI of zero may correspond to the default transmission power limit. As such, only DSIs 1-8 may be selectable by a processor 320. As shown in FIG. 7A, the transmission power limits specified by each DSI are decreasing in a linear matter as the DSI value increases. FIG. 7B provides another example of a LUT 700b corresponding to nine possible DSI values showing the various transmission power limits that may be specified according to the combination of the communication parameters/characteristics described above. The LUTs 700a and 700b may allow flexibility in choosing the range and specific of transmission power limits available according to the characteristics of each RAT and other device modes. Each of the LUTs 700a and 700b, or any of the LUTs described herein, may be stored in a memory unit 308. The LUTs 700a and 700b, or any of the LUTs described herein, may be stored in a memory unit 308 located on a chip for each RAT, or may be located on a single chip configured to control different RAT types.

According to one embodiment, a LUT may be provided to determine transmission power limits associated with each DSI according to various communication characteristics/parameters for each RAT type. FIG. 8 provides an example of a portion of a look up table 800 for determining transmission power limits for a given radio access technology type, antenna, a band-class, a configuration, and an uplink channel in accordance with some embodiments. Moreover, FIG. 8 provides another example of the combinations possible for different transmission power limit configurations for each DSI. Each row of the LUT 800 in FIG. 8 corresponds to the different combinations of the communication parameters/characteristics possible and indicates the transmission power limit for each DSI. Thus, the transmission power limits may be based on any combination of the column headings shown in FIG. 8.

According to some embodiments, the original equipment manufacturer (OEM) or other party may have the capability to provision tables with desired transmission power limits based on device operating modes. This may allow, for example, for an OEM to provision a table with transmission power limits which correspond to a DSI. Allowing the tables to be provisioned by the OEM may result in the OEM attempting to specify a transmission power limit that is higher than the transmission power limit supported by the RAT.

The controller 320 may be configured to capture the transmit power limits for each of antennas 370a, 370b, and 370n to properly manage transmit circuits 330a, 330b, and 330n.

As such, as described above, mapping between transmit circuits 330a, 330b, and 330n and antennas 370a, 370b, and 370n along with corresponding dynamic transmission power limit may be provided for multiple RAT types. For example, embodiments described herein may be used in conjunction with RAT types such as 1×, DO, GSM (and EDGE/GPRS), WCDMA/UMTS (and HSPA/HSPA+), LTE (FDD and TDD), TD-SCDMA, WLAN, and the like. Furthermore, dynamic transmission power limits and mappings between transmit circuits 330a, 330b, and 330n transmitting according to each RAT and antennas 370a, 370b, and 370n may be supported for a variety of concurrent RAT transmissions. For example, concurrent transmissions of 1×+DO, 1×+LTE, 1×+WLAN, DO+WLAN, GSM+WLAN, WCDMA/UMTS+WLAN, LTE+WLAN, TD-SCDMA+WLAN, 1×+DO+WLAN, 1×+LTE+WLAN, GSM+LTE, GSM+LTE+WLAN, 1×+GSM, DO+GSM, GSM+GSM, GSM+WCDMA/UMTS, GSM+TD-SCDMA, and the like may be supported. As such, mappings and power limits may be provided for each of these combinations.

In another embodiment, a controller 320 may be configured to determine how to switch the transmit circuits 330a, 330b, and 330c to antennas 370a, 370b, and 370c dynamically and/or autonomously based on various power level measurements, information about current interference scenarios, or based on other information.

With reference again to FIG. 4, for example, in some cases there may be one active transmit circuit 330 available for transmitting via at least two antennas 370a and 370b. In this case, in addition to having pre-determined mappings as descried above, a controller 320 may be configured to autonomously determine the mapping of the antennas 370a and 370b to the transmit circuit 330. For example, in one embodiment, the mapping of the antennas is based on the receive power levels of the antennas 370a and 370b. If one receive power level of one antenna 370a or 370b is higher than the other, it may be inferred that this antenna 370a or 370b is unblocked or at least has a higher performance level and therefore would be the more ideal antenna 370a or 370b for which to transmit using the transmit circuit 330. In one aspect, the antennas 370a and 370b may be configured to have the same power transmission limit. According to another aspect, different characteristics may be used to determine the mapping.

Indeed, in some embodiments, receive and transmit components may be paired in either static or dynamic arrangements. For example, in one embodiment, the transmit circuit 330 and a first receive circuit 340a may be paired such that they are configured to respectively transmit and receive via the same antenna 370a or 370b. Another second receive circuit 340b is configured to receive via the other antenna 370a or 370b. In one aspect, a default or "nominal" configuration may be defined where the transmit circuit 330 and first receive circuit 340a are configured to transmit and receive via the first antenna 370a while the second receive circuit 340b is configured to receive via the second antenna 370b. While in this default configuration, the first antenna 370a may be detected as de-sensed while the second antenna 370b is not de-sensed relative to the amount of de-sensing of the first antenna 370a. In this case, a controller 320 may use switching circuitry 360 to cross-switch at the antennas 370a and 370b such that the transmit circuit 330 and first receive circuit 340a are switched to respectively transmit and receive via the second antenna 370b. Likewise, the second receive circuit 340b is switched to receive via the first antenna 370a.

Detection of de-sensing may be done based on receive power levels as detected by the first and second receive circuits 340a and 340b. In one aspect, receive power levels may be obtained using receive automatic gain control (AGC) measurements from the first and second receive circuits 340a and 340b. In one aspect, if the transmit circuit 330 and the first receive circuit 340a are configured to transmit and receive via the first antenna 370a, the controller 320 may detect that a second receive power level of the second antenna 370a is higher than a first receive power level of the first antenna 370b. In response, the controller 320 switches the transmit circuit 330 and the first receive circuit 340a to respectively transmit and receive via the second antenna 370b. The controller 320 switches the second receive circuit 340b to receive via the first antenna 370a. Alternatively, if the transmit circuit 330 and the first receive circuit 340a are configured to transmit and receive via the second antenna 370a, the controller 320 may detect that the first receive power level of the first antenna 370b is higher than the second receive power level of the second antenna 370b. In response, the controller 320 switches the transmit circuit 330 and the first receive circuit 340a to respectively transmit and receive via the first antenna 370a while the second receive circuit 340b is switched to receive via the second antenna 370b.

Figure 9:
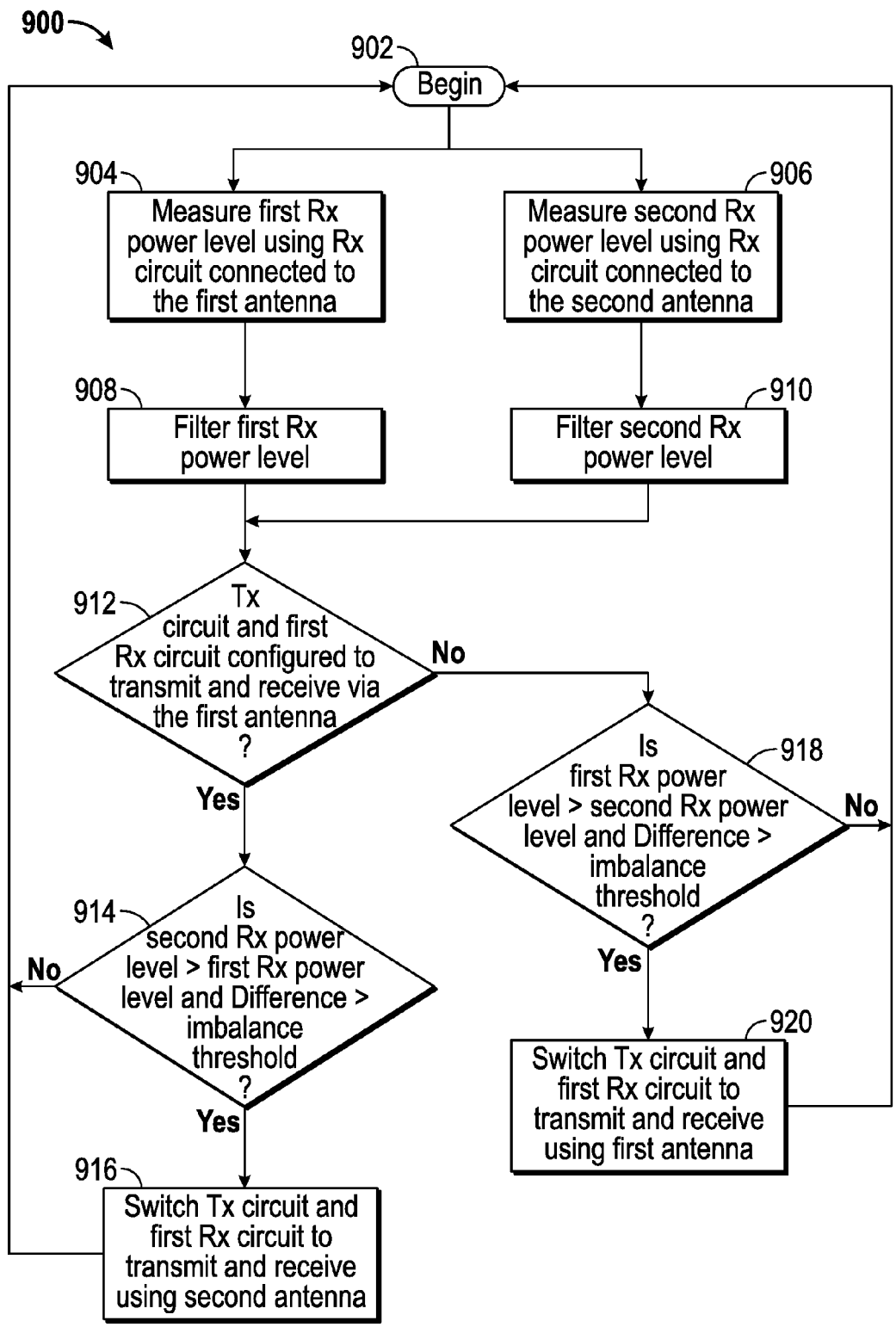
FIG. 9 is a flow chart of an implementation of an exemplary method for mapping a transmit circuit and first receive circuit to an antenna in accordance with some embodiments.

FIG. 9 is a flow chart of an implementation of an exemplary method 900 for mapping a transmit circuit 330 and first receive circuit 340a to an antenna 370a or 370b in accordance with some embodiments. According to some periodic time interval (e.g., every R seconds), a controller 320 is configured to measure a first receive power level using whichever receive circuit 340a or 340b is in connected to the first antenna 370a as shown in block 904. Concurrently or in addition, the controller 320 may measure a second receive power level using whichever receive circuit 340a or 340b is connected to the second antenna 370b as shown in block 906. The controller 320 may be configured to receive indications of the receive power levels via measurement circuitry 342a and 342b of the first and second receive circuits 340a and 340b.

The first and second receive power levels may be based on receive automatic gain control (AGC) measurements. For the receive AGC, the dwell time for every measurement/sample may be every S seconds. For data only, the sampling may take place during the forward link pilot burst durations within the S seconds. A filter may be included in the measurement circuitry 342a and 342b for both receive circuits 340a and 340b to filter the first and second receive power levels as shown in blocks 908 and 910. For example, the filters may be single-pole infinite impulse response (IIR) filters with some time constant.

Once the first and second receive power levels for each antenna 370a and 370b are obtained and filtered, a determination of the mapping and corresponding switching may be performed by the controller 320. The determination for whether to switch or not may be done every T seconds (e.g., range of 1 to 100 seconds). As such, at block 912, the controller 320 determines whether the transmit circuit 330 and first receive circuit 340a are configured to respectively transmit and receive via the first antenna 370a. In this case, it may then be determined whether there is a need to switch the transmit circuit 330 and first receive circuit 340a to use the second antenna 370b. If this is true, then at block 914, the controller 320 determines whether the second power level is greater than the first power level and whether difference between the two power levels is greater than an imbalance threshold. The imbalance threshold may be provided to ensure switching is not done unnecessarily. For example, it may only be necessary to switch the antennas 370a and 370b between the transmit and receive circuits 330, 340a, and 340b, if the difference between the two power levels is large enough. For example, the controller 320 may be configured to switch only if the difference between the two levels is greater than 10 dB. In one aspect, the imbalance threshold of block 914 may depend on a characteristic of the first receive power level at the first antenna, such as a thermal noise limit or some receive power floor. The amount of the threshold may be dynamic and will be further described below.

If the condition in block 914 is not satisfied, no switching is performed. If the condition in block 914 is satisfied, the controller 320 switches the transmit circuit 330 and first receive circuit 340a to respectively transmit and receive via the second antenna 370b. This may be done via switching circuitry 360 that may be controlled by the controller 320. Correspondingly, the controller 320 switches the second receive circuit 340b to receive via the first antenna 370a. As such, the controller 320 autonomously switches the transmit circuit 330 to transmit via an appropriate antenna 370a or 370b to improve performance based on the inference that the antenna 370a or 370b with the highest receive power will provide the best transmit performance. In some aspects, this may have a significant impact on the performance of the transmit circuit 330.

If the controller 320 detects that the transmit circuit 330 and first receive circuit 330 are currently configured to transmit and receive via the second antenna 370b, then in block 918, the controller 320 determines whether the first receive power level is greater than the second receive power level and if the difference between the two power levels is greater than the imbalance threshold. The imbalance threshold may depend on a characteristic of the second receive power level such as a thermal noise limit. If the controller 320 detects the condition of block 918 is not met, then no switching takes place. If the condition in block 918 is satisfied, then the controller 320 is configured to switch the transmit circuit 330 and the first receive circuit 340a to transmit and receive via the first antenna 370b. Correspondingly, the controller 320 is configured to switch the second receive circuit 340b to receive via the second antenna 370b. This process repeats for each interval of T seconds (e.g., 5 seconds) in which updated receive power levels are provided.

As described above, the imbalance threshold to trigger an actual switch may depend on a variety of factors for an imbalance in receive power level. The threshold may be a function of various receive or transmit characteristics. For example, as the lower of the two receive power levels approaches a receive power floor, the threshold to switch may be decreased (i.e., less difference between the two power levels is required to trigger a switch to the other antenna 370a or 370b). In one aspect, the receive power floor may correspond to a thermal noise limit.

Accordingly, the threshold may be dynamic and based on several factors. In some embodiments, the imbalance threshold may be retrieved via a look-up table (LUT) to allow for dynamic value mappings and allows to assess or infer if a receive power is close to the receive power floor. The imbalance threshold may be further based on interference levels and thermal levels. It should be further appreciated that in some cases the LUT may define a fixed or "flat" threshold.

Figure 10A:
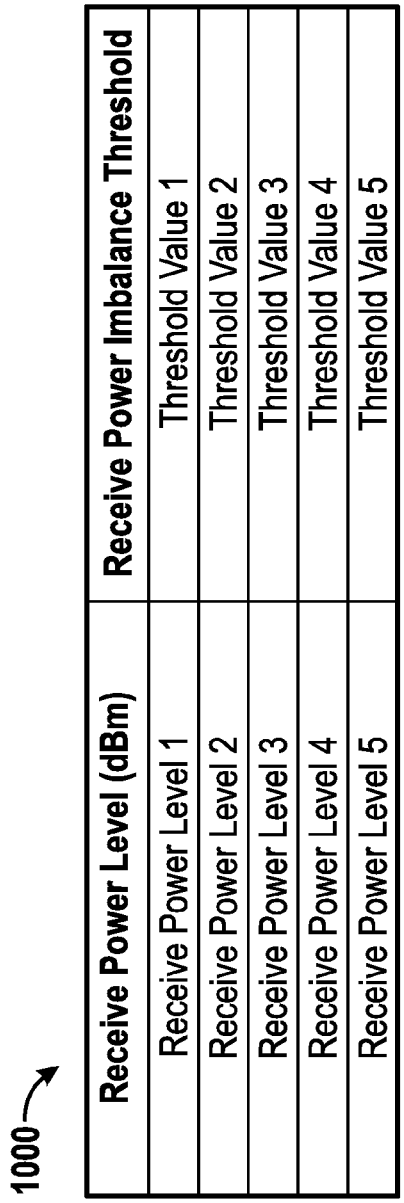
FIG. 10A shows an example of a LUT that may be used to determine an imbalance threshold as indexed by the corresponding receive power level in accordance with some embodiments.

FIG. 10A shows an example of a LUT 1000 that may be used to determine an imbalance threshold as indexed by the corresponding receive power level in accordance with some embodiments. The first column of the LUT 1000 provides various receive power levels. The choices of values for the first column may allow for controlling or limiting the imbalance threshold. The second column indicates the imbalance threshold according to the receive power level. To provide for dynamic adjustment of thresholds based on operating conditions, a different LUT 1000 may be provided for any number of operating modes, for example as determined by device state indexes (DSI) as described above where each DSI corresponds to a different operating condition or mode or combination thereof. The LUT 1000 shown in FIG. 10A shows five different imbalance thresholds; however, any number of different transmission power levels may be used. The LUT 1000 may be stored in a memory unit 308.

Figure 10B:
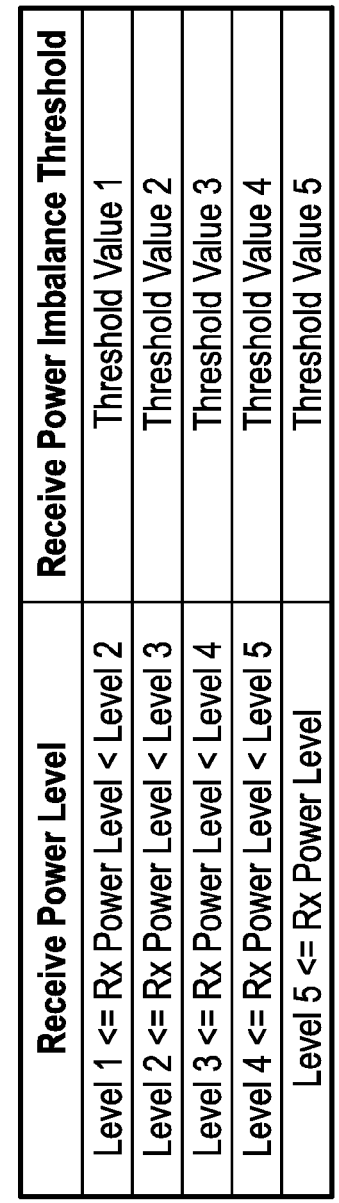
FIG. 10B shows a table that illustrates how the LUT may be used to determine the imbalance threshold based on the receive power levels for an antenna in accordance with some embodiments.

FIG. 10B shows a table 1002 that illustrates how the LUT 1000 may be used to determine the imbalance threshold based on the receive power levels for an antenna 370a or 370b in accordance with some embodiments. The receive power level is compared against the receive power levels defined in the LUT 1000. If the receive power level is between the first and second levels as defined by the LUT 1002, then the associated imbalance threshold may be applied. Thereafter, if the current receive power level is between the second and third levels as defined by the LUT 1002, then the associated imbalance threshold associated with the second receive power level may be applied and so on.

In addition, if both the first receive power level and the second receive power level are below a threshold, the controller 320 may be configured to switch to the default configuration as described above.

Moreover, when a switch takes place, the access terminal 106 may perform various actions in response. For example, the controller 320 may be configured to perform the switch immediately before the start of searches for pilots in the active set. Moreover, after the controller 320 switches, the controller 320 may further be configured to reset the pilot filter (i.e., set the pilot filters to acquisition mode). In addition, after the controller 320 switches, the controller 320 and or receive circuits 340a and 340b may be configured to ignore reverse power control (RPC) commands for a determined amount of time. In fact, the controller 320 may be configured to declare RPC erasure (i.e., hold transmit power).

In the event that antennas 370a and 370b have different transmit power limits (e.g., as could be determined by the corresponding transmit circuit 330 according to a particular RAT), then the controller 320 may be further configured to switch based on associated transmit power limits. In accordance, the process for deciding when/how to switch may be dependent on the transmit power limits. As such, the switching may be some function of not only the receive power levels but the current transmit power limits that may be determined as descried above. For example, in one embodiment, the transmit circuit 330 and the first receive circuit 340a may be in a configuration to transmit and receive via the first antenna 370a. In this case, the controller 320 may be configured to switch the transmit circuit 330 and receive circuit 340a to respectively transmit and receive via the second antenna 370b if:

the first receive power level is greater than the second receive power level; and the difference between the first receive power level and the second receive power level added to the difference between a first transmit power limit of the first antenna 370a and a second transmit power limit of the second antenna 370b is greater than the imbalance threshold.

In an embodiment, the imbalance threshold may be determined via a LUT indexed by the first receive power level.

Likewise, the transmit circuit 330 and the first receive circuit 340a may be in a configuration to transmit and receive via the second antenna 370b. In this case, the controller 320 may be configured to switch the transmit circuit 330 and receive circuit 340a to respectively transmit and receive via the first antenna 370a if:
- the first receive power level is greater than the second receive power level; and
- the difference between the first receive power level and the second receive power level added to the difference between the second transmit power limit of the second antenna 370b and the first transmit power limit of the first antenna 370a is greater than the imbalance threshold.

The imbalance threshold may be determined via a LUT indexed by the first receive power level.

Using the transmit power limits as just described may relax the standard by which the controller 320 switches when the "other" antenna has a higher transmit power limit. Similarly, the standard by which the controller 320 switches may be more strict when the "other" antenna has a lower transmit power limit.

It should be appreciated that the principles described above with reference to FIGS. 9-10 may be applied similarly where the number of transmit circuits is greater than one and with multiple antennas. Accordingly, the controller 320 may be configured to autonomously switch multiple transmit circuits 330a, 330b, and 330n (FIG. 3) based on receive power levels of multiple receive circuits 340a, 340c, and 340n.

Figure 11:
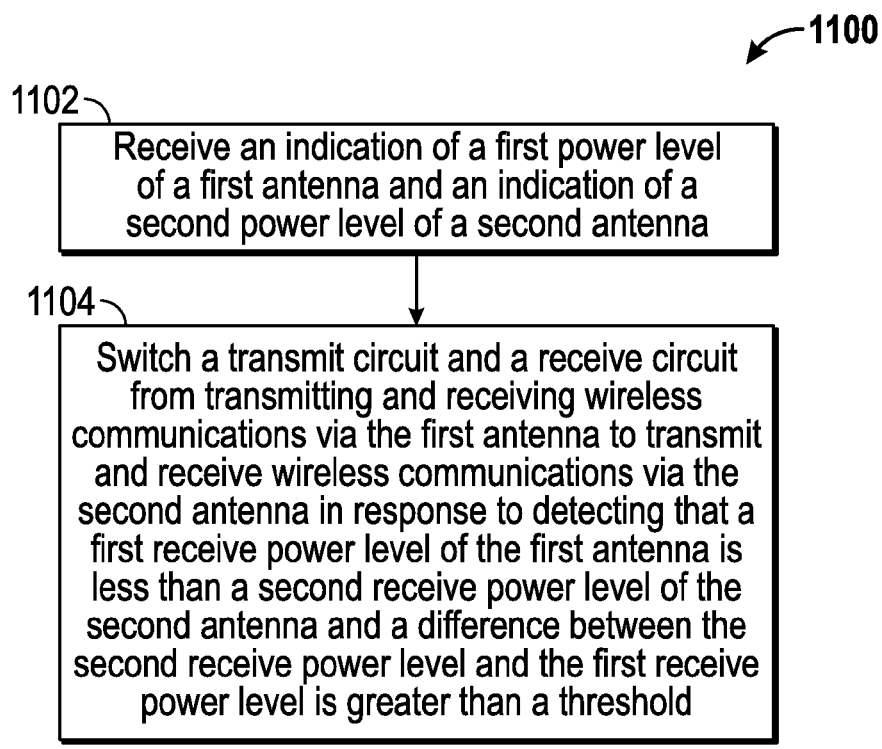
FIG. 11 shows a flowchart of an implementation of an exemplary method implemented by a wireless communication apparatus in accordance with some embodiments.

FIG. 11 shows a flowchart of an implementation of an exemplary method 1100 implemented by a wireless communication apparatus in accordance with some embodiments. The method 1100 may be implemented at a wireless communication apparatus implemented as an access terminal 106, for example. Although the method 1100 is described below with respect to elements of the access terminal 106, those having ordinary skill in the art will appreciate that other components may be used to implement one or more of the blocks described herein.

At block 1102, an indication is received of a first power level of a first antenna 370a and a second power level of a second antenna 370b. In one aspect, the indication may be received at a controller 320. At block 1104, a transmit circuit 330 and receive circuit 340a may be switched from transmitting and receiving wireless communications via the first antenna 370a to transmit and receive wireless communications via the second antenna 370b in response to detecting that a first receive power level of the first antenna 370a is less than a second receive power level of the second antenna 370b and a difference between the second receive power level and the first receive power level is greater than a threshold. In one aspect, a controller 320 may control switching circuitry 360 to perform the switching.

Figure 12:
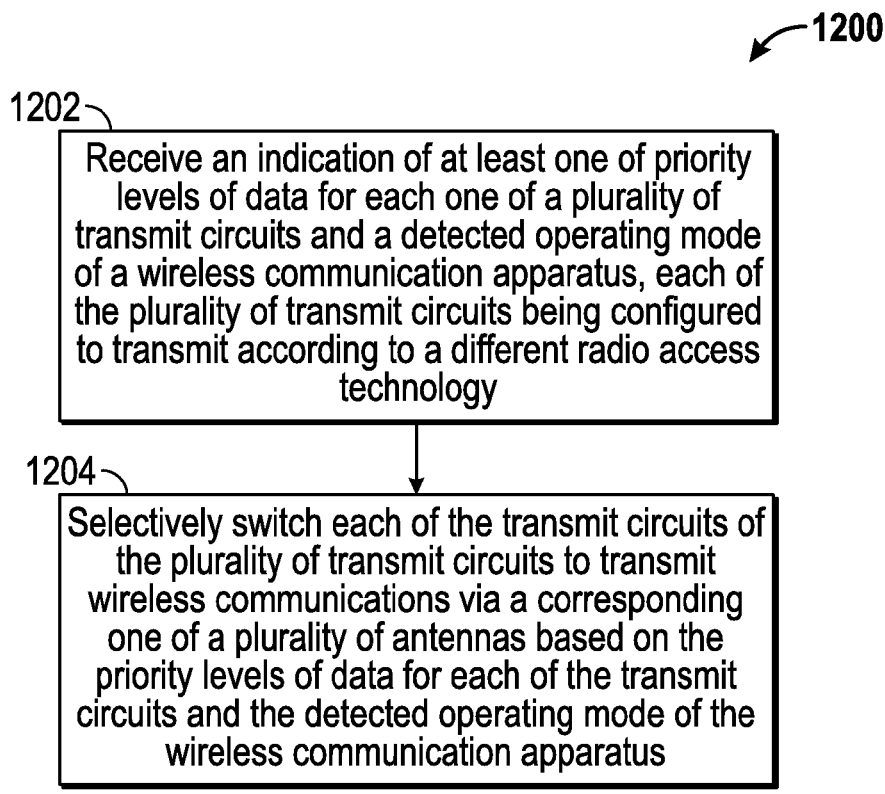
FIG. 12 shows another flowchart of an implementation of an exemplary method implemented by a wireless communication apparatus in accordance with some embodiments.

FIG. 12 shows a flowchart of an implementation of an exemplary method 1200 implemented by a wireless communication apparatus in accordance with some embodiments. The method 1200 may be implemented at a wireless communication apparatus implemented as an access terminal 106. Although the method 1200 is described below with respect to elements of the access terminal 106, those having ordinary skill in the art will appreciate that other components may be used to implement one or more of the blocks described herein.

At block 1202, an indication is received of at least one of priority levels of data for each one of a plurality of transmit circuits 330a, 330b, and 330n and a detected operating mode of a wireless communication apparatus, each of the plurality of transmit circuits 330a, 330b, and 330n being configured to transmit according to a different radio access technology. In one aspect, the indication may be received by controller 320. At block 1204, each of the transmit circuits 330a, 330b, and 330n of the plurality of transmit circuits is selectively switched to transmit wireless communications via a corresponding one of a plurality of antennas 370a, 370b, and 370n based on the priority levels of data for each of the transmit circuits and the detected operating mode of the wireless communications apparatus. The switching may be performed by a controller 320.

Figure 13:
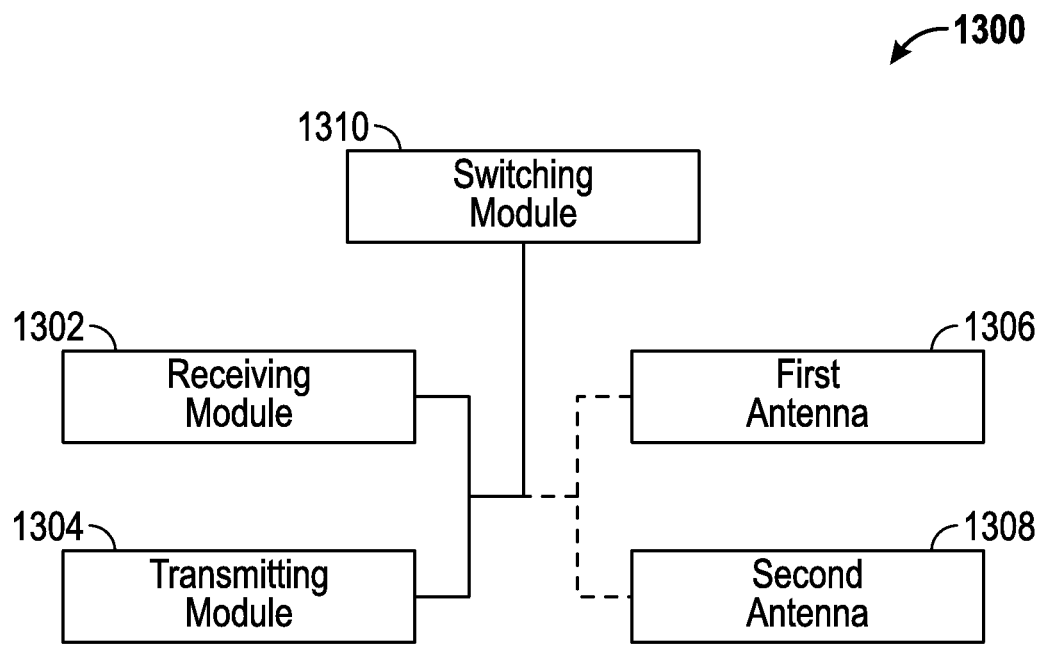
FIG. 13 is a functional block diagram of another exemplary wireless communication apparatus that may be employed within the wireless communication system in accordance with some embodiments.

FIG. 13 is a functional block diagram of another exemplary wireless communication apparatus 1300 that may be employed within the wireless communication system 100 in accordance with some embodiments. Those skilled in the art will appreciate that a wireless communication device 1300 may have more components, such as any one or more of the components shown in FIG. 3. The wireless communication device 1300 shown includes only those components useful for describing some prominent features of certain embodiments. The device 1300 includes a receiving module 1302 and a transmitting module 1304. In some cases, a means for receiving may include the receiving module 1302. In some cases, a means for transmitting may include a transmitting module 1304. The device 1300 further includes a first antenna 1306 and second antenna 1308. The device 1300 further includes a switching module 1310. The switching module 1310 may be configured to perform one or more of the functions described above with respect to blocks 1102 and 1104 of FIG. 11. In some cases, a means for switching may include the switching module 1310. The switching module may be a controller 320 and may include switching circuitry 360.

Figure 14:
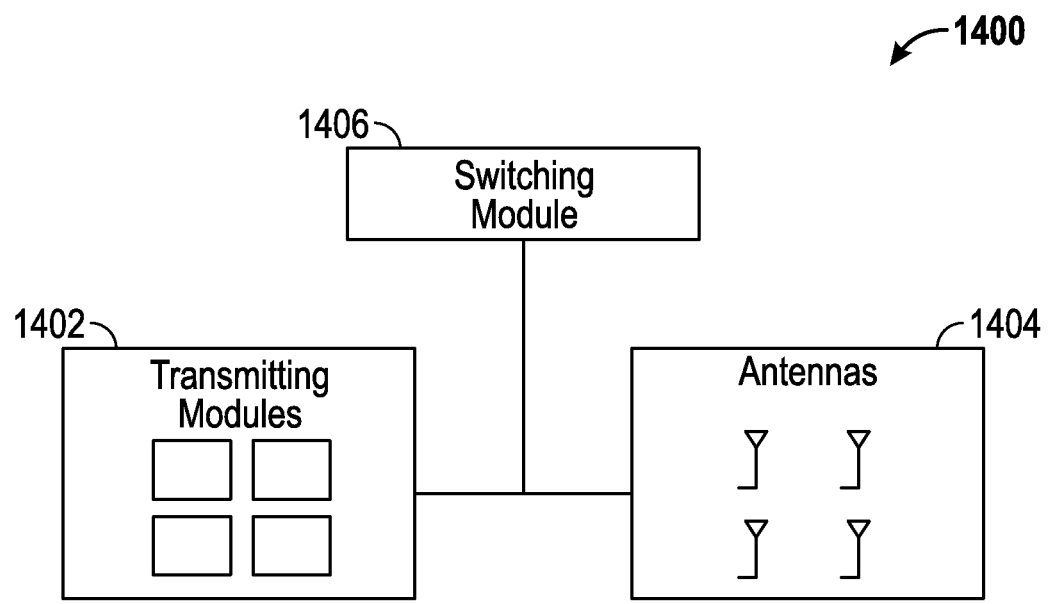
FIG. 14 is a functional block diagram of another exemplary wireless communication apparatus that may be employed within the wireless communication system in accordance with some embodiments.

FIG. 14 is a functional block diagram of another exemplary wireless device 1400 that may be employed within the wireless communication system 100 in accordance with some embodiments. Those skilled in the art will appreciate that a wireless communication device 1400 may have more components, such as any one or more of the components shown in FIG. 3. The wireless communication device 1400 shown includes only those components useful for describing some prominent features of certain embodiments. The device 1400 includes transmitting modules 1402. In some cases, a means for transmitting may include one of the transmitting modules 1402. The device 1400 further includes a plurality of antennas 1404. The device 1400 further includes a switching module 1406. The switching module 1406 may be configured to perform one or more of the functions described above with respect to blocks 1202 and 1204 of FIG. 12. In some cases, a means for switching may include the switching module 1406. The switching module 1406 may be a controller 320 and may include switching circuitry 360.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Figure 15:
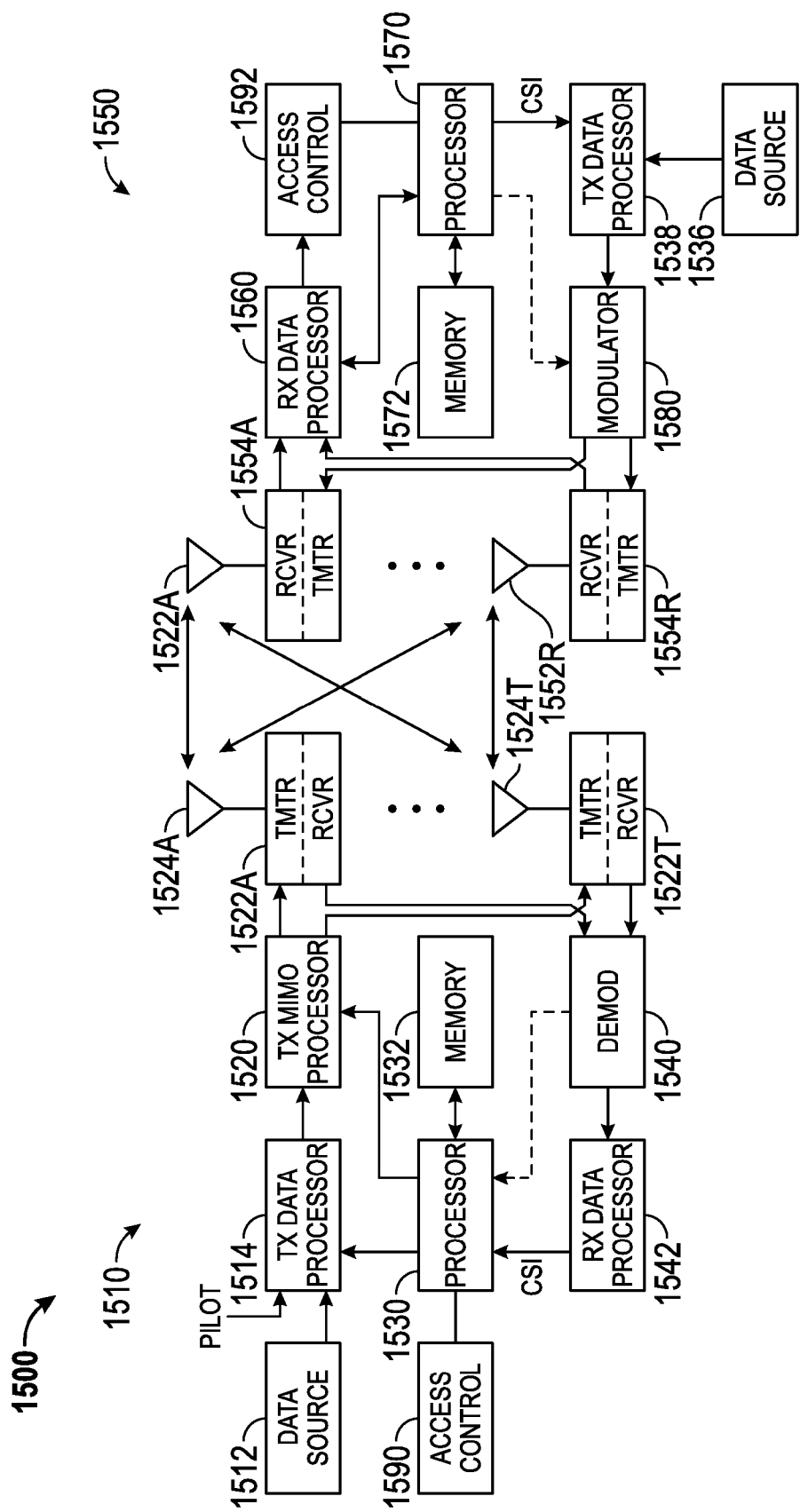
FIG. 15 shows an example of a functional block diagram of various components in a communication system in accordance with some embodiments.

Furthermore, as indicated by the systems and methods described above, the teachings herein may be incorporated into a node (e.g., a device) employing various components for communicating with at least one other node. FIG. 15 depicts several sample components that may be employed to facilitate communication between nodes in accordance with some embodiments. Specifically, FIG. 15 is a simplified block diagram of a first wireless device 1510 (e.g., an access point) and a second wireless device 1550 (e.g., an access terminal) of a multiple-in-multiple-out (MIMO) system 1500. At the first device 1510, traffic data for a number of data streams is provided from a data source 1512 to a transmit (TX) data processor 1514.

In some aspects, each data stream is transmitted over a respective transmit antenna. The TX data processor 1514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1530. A data memory 1532 may store program code, data, and other information used by the processor 1530 or other components of the device 1510.

The modulation symbols for all data streams are then provided to a TX MIMO processor 1520, which may further process the modulation symbols (e.g., for OFDM). The TX MIMO processor 1520 then provides $N_T$ modulation symbol streams to $N_T$ transceivers (XCVR) 1522A through 1522T. In some aspects, the TX MIMO processor 1520 applies beam-forming weights to the symbols of the data streams and to the antenna from which the symbol is being transmitted.

Each transceiver 1522 receives and processes a respective symbol stream to provide one or more analog signals, and further conditions (e.g., amplifies, filters, and up converts) the analog signals to provide a modulated signal suitable for transmission over the MIMO channel. $N_T$ modulated signals from transceivers 1522A through 1522T are then transmitted from $N_T$ antennas 1524A through 1524T, respectively.

At the second device 1550, the transmitted modulated signals are received by $N_R$ antennas 1552A through 1552R and the received signal from each antenna 1552 is provided to a respective transceiver (XCVR) 1554A through 1554R. Each transceiver 1554 conditions (e.g., filters, amplifies, and down converts) a respective received signal, digitizes the conditioned signal to provide samples, and further processes the samples to provide a corresponding "received" symbol stream.

A receive (RX) data processor 1560 then receives and processes the $N_R$ received symbol streams from $N_R$ transceivers 1554 based on a particular receiver processing technique to provide $N_T$ "detected" symbol streams. The RX data processor 1560 then demodulates, deinterleaves, and decodes each detected symbol stream to recover the traffic data for the data stream. The processing by the RX data processor 1560 is complementary to that performed by the TX MIMO processor 1520 and the TX data processor 1514 at the device 1510.

A processor 1570 periodically determines which pre-coding matrix to use (discussed below). The processor 1570 formulates a reverse link message comprising a matrix index portion and a rank value portion. A data memory 1572 may store program code, data, and other information used by the processor 1570 or other components of the second device 1550.

The reverse link message may comprise various types of information regarding the communication link and/or the received data stream. The reverse link message is then processed by a TX data processor 1538, which also receives traffic data for a number of data streams from a data source 1536, modulated by a modulator 1580, conditioned by the transceivers 1554A through 1554R, and transmitted back to the device 1510.

At the device 1510, the modulated signals from the second device 1550 are received by the antennas 1524, conditioned by the transceivers 1522, demodulated by a demodulator (DEMOD) 1540, and processed by a RX data processor 1542 to extract the reverse link message transmitted by the second device 1550. The processor 1530 then determines which pre-coding matrix to use for determining the beam-forming weights then processes the extracted message.

FIG. 15 also illustrates that the communication components may include one or more components that perform access control operations as taught herein. For example, an access control component 1590 may cooperate with the processor 1530 and/or other components of the device 1510 to send/receive signals to/from another device (e.g., device 1550) as taught herein. Similarly, an access control component 1592 may cooperate with the processor 1570 and/or other components of the device 1550 to send/receive signals to/from another device (e.g., device 1510). It should be appreciated that for each device 1510 and 1550 the functionality of two or more of the described components may be provided by a single component. For example, a single processing component may provide the functionality of the access control component 1590 and the processor 1530 and a single processing component may provide the functionality of the access control component 1592 and the processor 1570. Furthermore, the components of the apparatus 1500 described with reference to FIG. 3 may be incorporated with/into the components of FIG. 15.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-15 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the embodiments described in this disclosure may be readily apparent to those skilled in the art, and the generic principles defined herein may be applied to other embodiments without departing from the spirit or scope of this disclosure. Thus, the disclosure is not intended to be limited to the embodiments shown herein, but is to be accorded the widest scope consistent with the claims, the principles and the novel features disclosed herein. The word "exemplary" is used exclusively herein to mean "serving as an example, instance, or illustration." Any embodiment described herein as "exemplary" is not necessarily to be construed as preferred or advantageous over other embodiments.

Certain features that are described in this specification in the context of separate embodiments also can be implemented in combination in a single embodiment. Conversely, various features that are described in the context of a single embodiment also can be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

What is claimed is:

1. A wireless communication apparatus, comprising:
a plurality of antennas;
a plurality of transmit circuits, each transmit circuit of the plurality of transmit circuits being configured to transmit according to a different radio access technology; and
a controller configured to selectively switch each of the transmit circuits of the plurality of transmit circuits to transmit wireless communications via a corresponding one of the plurality of antennas based on priority levels of data for each of the transmit circuits and a detected operating mode of the wireless communication apparatus, and further based on antenna preference of each of the transmit circuits, wherein each antenna preference is based on at least one of: power limits of each of the plurality of transmit circuits, or a transmit power level of at least one of the plurality of transmit circuits.

2. The wireless communication apparatus of claim 1, wherein the controller is configured to selectively switch based on a predetermined mapping of the transmit circuits to the plurality of antennas for combinations of priority levels and detected operating modes.

3. The wireless communication apparatus of claim 2, further comprising a memory configured to store the predetermined mapping.

4. The wireless communication apparatus of claim 2, wherein the predetermined mapping of transmit circuits to the plurality of antennas is fixed for each combination of operating mode, current set of active transmit circuits of the plurality of transmit circuits, priority levels of the set of active transmit circuits, and antenna preference of each of the plurality of transmit circuits.

5. The wireless communication apparatus of claim 4, wherein the antenna preference of each of the plurality of transmit circuits is based on the transmit power limits of each of the plurality of transmit circuits, and wherein the priority levels are based on voice communications or data only communications, voice communications having a higher priority than data communications.

6. The wireless communication apparatus of claim 2, wherein the controller is configured to selectively switch based on the predetermined mapping by:
mapping the detected operating mode to a determined value; and
providing the determined value to a look-up table, the look-up table configured to provide the predetermined mapping based on the determined value.

7. The wireless communication apparatus of claim 1, wherein the controller is configured to selectively switch further based on which of the plurality of transmit circuits are active.

8. The wireless communication apparatus of claim 1, further comprising a plurality of proximity sensors configured to sense proximity of an object relative to each of the plurality of antennas, and wherein the detected operating mode is based at least in part on state information of the plurality of proximity sensors.

9. The wireless communication apparatus of claim 1, wherein the controller is configured to selectively switch each of the transmit circuits of the plurality of transmit circuits to communicate via a corresponding one of the plurality of antennas based further on a performance characteristic of the wireless communication apparatus.

10. The wireless communication apparatus of claim 9, wherein the performance characteristic comprises a transmit power level of at least one of the plurality of transmit circuits, an amount of interference between at least two antenna of the plurality of antennas, a target quality of service level for at least one of the transmit circuits, and a regulatory requirement for a transmit power level for at least one of the transmit circuits.

11. The wireless communication apparatus of claim 1, wherein the operating mode is based on at least one of a proximity of the wireless communication apparatus to a user, an orientation of the wireless communication device, a communications mode, and information based on blocking of any of the plurality of antennas.

12. The wireless communication apparatus of claim 1, wherein the controller is configured to selectively switch in response to receiving an indication of at least one of a change in a number of active transmit circuits of the plurality of transmit circuits, a change in the priority levels of data for each of the transmit circuits, and a change in an operating mode of the wireless communication apparatus.

13. The wireless communication apparatus of claim 1, wherein the radio access technology corresponds to at least one of a wireless wide area network, a wireless local area network, a wireless network for sending voice communications, a wireless network for sending data communications, or any combination thereof.

14. A method implemented in a wireless communication apparatus, the method comprising:
receiving an indication of at least one of priority levels of data for each one of a plurality of transmit circuits and a detected operating mode of the wireless communication apparatus, each of the plurality of transmit circuits being configured to transmit according to a different radio access technology; and
selectively switching each of the transmit circuits of the plurality of transmit circuits to transmit wireless communications via a corresponding one of a plurality of antennas based on the priority levels of data for each of the transmit circuits and the detected operating mode of the wireless communication apparatus, and further based on antenna preference of each of the transmit circuits, wherein each antenna preference is based on at least one of: power limits of each of the plurality of transmit circuits, or a transmit power level of at least one of the plurality of transmit circuits.

15. The method of claim 14, wherein selectively switching comprises selectively switching based on a predetermined mapping of the transmit circuits to the plurality of antennas for combinations of priority levels and detected operating modes.

16. The method of claim 15, wherein the predetermined mapping of transmit circuits to the plurality of antennas is fixed for each combination of operating mode, current set of active transmit circuits of the plurality of transmit circuits, priority levels of the set of active transmit circuits, and antenna preference of each of the plurality of transmit circuits.

17. The method of claim 16, wherein the antenna preference of each of the plurality of transmit circuits is based on the transmit power limits of each of the plurality of transmit circuits, and wherein the priority levels are based on voice communications or data only communications, voice communications having a higher priority than data communications.

18. The method of claim 15, the method further comprising:
mapping the detected operating mode to a determined value; and
providing the determined value to a look-up table, the look-up table configured to provide the predetermined mapping based on the determined value.

19. The method of claim 14, wherein selectively switching further comprises selectively switching based on which of the plurality of transmit circuits are active.

20. The method of claim 14, wherein the operating mode is based on at least in part on state information of a plurality of proximity sensors configured to sense proximity of an object relative to each of the plurality of antennas.

21. The method of claim 14, wherein selectively switching further comprises selectively switching each of the transmit circuits of the plurality of transmit circuits to communicate via a corresponding one of the plurality of antennas based further on a performance characteristic of the wireless communication apparatus.

22. The method of claim 21, wherein the performance characteristic comprises a transmit power level of at least one of the plurality of transmit circuits, an amount of interference between at least two antenna of the plurality of antennas, a target quality of service level for at least one of the transmit circuits, and a regulatory requirement for a transmit power level for at least one of the transmit circuits.

23. The method of claim 14, wherein the operating mode is based on at least one of a proximity of the wireless communication apparatus to a user, an orientation of the wireless communication device, a communications mode, and information based on blocking of any of the plurality of antennas.

24. The method of claim 14, wherein selectively switching comprises selectively switching in response to receiving an indication of at least one of a change in a number of active transmit circuits of the plurality of transmit circuits, a change in the priority levels of data for each of the transmit circuits, and a change in an operating mode of the wireless communication apparatus.

25. A wireless communication apparatus, comprising:
   means for receiving an indication of at least one of priority levels of data for each one of a plurality of transmit circuits and a detected operating mode of the wireless communication apparatus, each of the plurality of transmit circuits being configured to transmit according to a different radio access technology; and
   means for selectively switching each of the transmit circuits of the plurality of transmit circuits to transmit wireless communications via a corresponding one of a plurality of antennas based on the priority levels of data for each of the transmit circuits and the detected operating mode of the wireless communication apparatus, and further based on antenna preference of each of the transmit circuits, wherein each antenna preference is based on at least one of: power limits of each of the plurality of transmit circuits, or a transmit power level of at least one of the plurality of transmit circuits.

26. The wireless communication apparatus of claim 25, wherein the means for selectively switching comprises means for selectively switching based on a predetermined mapping of the transmit circuits to the plurality of antennas for combinations of priority levels and detected operating modes.

27. The wireless communication apparatus of claim 26, wherein the predetermined mapping of transmit circuits to the plurality of antennas is fixed for each combination of operating mode, current set of active transmit circuits of the plurality of transmit circuits, priority levels of the set of active transmit circuits, and antenna preference of each of the plurality of transmit circuits.

28. The wireless communication apparatus of claim 26, further comprising:
   means for mapping the detected operating mode to a determined value; and
   means for providing the determined value to a look-up table, the look-up table configured to provide the predetermined mapping based on the determined value.

29. The wireless communication apparatus of claim 25, wherein the means for selectively switching further comprises means for selectively switching based on which of the plurality of transmit circuits are active.

30. The wireless communication apparatus of claim 25, wherein the operating mode is based on at least in part on state information of a plurality of proximity sensors configured to sense proximity of an object relative to each of the plurality of antennas.

31. The wireless communication apparatus of claim 25, wherein the means for selectively switching further comprises means for selectively switching each of the transmit circuits of the plurality of transmit circuits to communicate via a corresponding one of the plurality of antennas based further on a performance characteristic of the wireless communication apparatus.

32. The wireless communication apparatus of claim 25, wherein the operating mode is based on at least one of a proximity of the wireless communication apparatus to a user, an orientation of the wireless communication device, a communications mode, and information based on blocking of any of the plurality of antennas.

33. The wireless communication apparatus of claim 25, wherein the means for selectively switching comprises means for selectively switching in response to receiving an indication of at least one of a change in a number of active transmit circuits of the plurality of transmit circuits, a change in the priority levels of data for each of the transmit circuits, and a change in an operating mode of the wireless communication apparatus.

34. A computer program product, comprising:
   a non-transitory computer readable medium comprising:
      code for receiving an indication of at least one of priority levels of data for each one of a plurality of transmit circuits and a detected operating mode of the wireless communication apparatus, each of the plurality of transmit circuits being configured to transmit according to a different radio access technology; and
      code for selectively switching each of the transmit circuits of the plurality of transmit circuits to transmit wireless communications via a corresponding one of a plurality of antennas based on the priority levels of data for each of the transmit circuits and the detected operating mode of the wireless communication apparatus, and further based on antenna preference of each of the transmit circuits, wherein each antenna preference is based on at least one of: power limits of each of the plurality of transmit circuits, or a transmit power level of at least one of the plurality of transmit circuits.

35. The computer program product of claim 34, wherein the code for selectively switching comprises code for selectively switching based on a predetermined mapping of the transmit circuits to the plurality of antennas for combinations of priority levels and detected operating modes.

36. The computer program product of claim 35, wherein the predetermined mapping of transmit circuits to the plurality of antennas is fixed for each combination of operating mode, current set of active transmit circuits of the plurality of transmit circuits, priority levels of the set of active transmit circuits, and antenna preference of each of the plurality of transmit circuits.

37. The computer program product of claim 34, wherein the code for selectively switching further comprises code for selectively switching based on which of the plurality of transmit circuits are active.

38. The computer program product of claim 34, wherein the operating mode is based on at least in part on state information of a plurality of proximity sensors configured to sense proximity of an object relative to each of the plurality of antennas.

39. The computer program product of claim 34, wherein the code for selectively switching further comprises code for selectively switching each of the transmit circuits of the plurality of transmit circuits to communicate via a corresponding one of the plurality of antennas based further on a performance characteristic of the wireless communication apparatus.

40. The computer program product of claim 34, wherein the operating mode is based on at least one of a proximity of the wireless communication apparatus to a user, an orientation of the wireless communication device, a communications mode, and information based on blocking of any of the plurality of antennas.

41. The computer program product of claim 34, wherein the code for selectively switching comprises code for selectively switching in response to receiving an indication of at least one of a change in a number of active transmit circuits of the plurality of transmit circuits, a change in the priority levels of data for each of the transmit circuits, and a change in an operating mode of the wireless communication apparatus.

* * * * *